US011110474B2

(12) United States Patent
Dubiel

(10) Patent No.: US 11,110,474 B2
(45) Date of Patent: Sep. 7, 2021

(54) FLUID CONTROL ASSEMBLY FOR MIX-ON-DEMAND SPRAYER

(71) Applicant: Chapin Manufacturing, Inc., Batavia, NY (US)

(72) Inventor: David J. Dubiel, Franconia, NH (US)

(73) Assignee: Chapin Manufacturing, Inc., Batavia, NY (US)

( * ) Notice: Subject to any disclaimer, the term of this patent is extended or adjusted under 35 U.S.C. 154(b) by 182 days.

(21) Appl. No.: 16/666,565

(22) Filed: Oct. 29, 2019

(65) Prior Publication Data

US 2020/0061654 A1 Feb. 27, 2020

Related U.S. Application Data

(63) Continuation-in-part of application No. 15/725,937, filed on Oct. 5, 2017, now Pat. No. 10,464,087.

(51) Int. Cl.
| | | |
|---|---|---|
| *B05B 12/14* | (2006.01) | |
| *B05B 7/24* | (2006.01) | |
| *B05B 7/12* | (2006.01) | |
| *B05B 9/04* | (2006.01) | |
| *B05B 7/28* | (2006.01) | |
| *F04B 49/24* | (2006.01) | |

(52) U.S. Cl.
CPC ............. *B05B 12/14* (2013.01); *B05B 7/12* (2013.01); *B05B 7/2472* (2013.01); *B05B 7/28* (2013.01); *B05B 9/0403* (2013.01); *F04B 49/24* (2013.01)

(58) Field of Classification Search
CPC ....... B05B 7/12; B05B 7/2472; B05B 7/2486; B05B 7/26; B05B 7/28; B05B 7/30; B05B 9/0403; B05B 12/14; F04B 49/035; F04B 49/24; F04B 49/243; F04B 49/246; A01M 7/0089; G05D 11/02
See application file for complete search history.

(56) References Cited

U.S. PATENT DOCUMENTS

| | | | | |
|---|---|---|---|---|
| 4,913,345 A | * | 4/1990 | Setter | A01M 7/0042 239/127 |
| 8,496,188 B2 | * | 7/2013 | Linton | F04B 17/06 239/124 |

(Continued)

FOREIGN PATENT DOCUMENTS

WO        WO-8910050 A1 * 11/1989  ........... B05B 7/2486

*Primary Examiner* — Darren W Gorman
(74) *Attorney, Agent, or Firm* — Woods Oviatt Gilman LLP; Katherine H. McGuire, Esq.

(57) ABSTRACT

A flow control assembly includes a manifold coupled to a positive displacement pump. A fluid input unit is coupled to the fluid inlet and includes a diluent input to receive a diluent and a concentrate input to receive a selectively adjustable flow of a liquid concentrate. A mixing chamber combines the diluent and the liquid concentrate to form a mixed solution to be delivered to the pump. A bypass unit has a bypass conduit to receive a high pressure mixed fluid from the pump. A bypass valve is positionable within the manifold between a closed position and an open position. The bypass valve is closed when the high pressure mixed fluid is below a threshold pressure and open when the high pressure mixed fluid is above the threshold pressure. A portion of the high pressure mixed fluid is reintroduced to the mixing chamber via the bypass inlet.

11 Claims, 24 Drawing Sheets

(56) References Cited

U.S. PATENT DOCUMENTS

| | | | |
|---|---|---|---|
| 2011/0079659 A1* | 4/2011 | Wilken | A01M 7/0042 239/73 |
| 2011/0142685 A1* | 6/2011 | Gilpatrick | F04B 49/20 417/34 |
| 2013/0140375 A1* | 6/2013 | Easton | A01M 7/0085 239/124 |

* cited by examiner

FLUID CONTROL ASSEMBLY FOR MIX-ON-DEMAND SPRAYER

CROSS REFERENCE TO RELATED APPLICATIONS

This application is a continuation-in-part of pending U.S. patent application Ser. No. 15/725,937 filed Oct. 5, 2017, entitled "MIX ON DEMAND SPRAYER," the contents of which are fully incorporated herein.

FIELD OF THE INVENTION

The present invention generally relates to sprayers, and more particularly to a sprayer configured to dilute a fluid concentrate with a diluent prior to spraying, and still more particularly to a pump-driven delivery system including a high pressure fluid bypass circuit for alleviating pump stresses when dispensing fluids at different pressures and/or volumes.

BACKGROUND OF THE INVENTION

Sprayers, such as broadcast sprayers are used across an array of applications, including farms, golf courses and residential properties, to apply water or other liquids, such as pesticides including herbicides, insecticides and the like. As such, these sprayers may need to cover a large area and, therefore, generally include large tanks strapped to a vehicle, such as an all-terrain vehicle (ATV) or golf cart, or may be mounted onto a tow-behind trailer. Typically in use, these tanks are filled with a selected fluid composition that is to be applied. By way of example, pesticide solutions may be anywhere from about 1% to about 10% active chemical in water. In one scenario, a user may spray a diluted herbicide solution, such as to target thistle. However, to apply a second pesticide solution, such as a diluted insecticide to fruit trees, the user will first have to completely empty the tank of the herbicide solution before rinsing the tank of any residual chemicals and finally refilling the tank with the desired insecticide solution. As may be readily apparent from the above, there are numerous drawbacks to such systems. For example and without limitation, such drawbacks may include waste of chemicals, the need for controlled disposal of unused chemicals, the time consuming need to thoroughly clean the tank between applications and the potential for cross-contamination and application of unwanted chemicals after incomplete or unsuccessful cleaning of the tank.

To alleviate some of the above-referenced drawbacks of broadcast sprayers, systems have been developed which segregate the chemical portion from the water/diluent portion of the system. In such systems, the chemical is stored in a smaller, separate tank than the large water tank. Metering devices may then add chemical to a flow of water prior to emission from a wand or boom sprayer. In this manner, the chemical remains isolated from the water tank, thereby minimizing or avoiding possible contamination of the water source. However, heretofore systems require complex plumbing regimes and interconnectivities of the various components making such systems difficult to use and burdensome to operate and clean.

Broadcast sprayers have also been configured as variable pressure sprayers which may selectively spray fluid from either a spray wand or through a boom-and-nozzle arrangement where multiple nozzles may be supported on a boom. Due to the multiple nozzles within the boom-and-nozzle arrangement, fluid must be delivered at high pressure so as to enable proper spraying at each of the individual nozzles. However, a spray wand uses a single nozzle and may become damaged if it receives high pressure fluid. To that end, current systems typically use pumps with a high pressure cut out switch. These systems are configured with a recirculation manifold whereby excess flow from the pump is diverted back to the supply tank. A valve and pressure gauge is provided on the manifold so the user can tune the percentage of flow going back to the tank while maintaining adequate pressure for the lower flow application (spray wand). Without providing for this recirculation pressure bleed off in the low flow application, pressure would build quickly and rapidly cycle the pressure cut off switch. A situation that is detrimental to both the switch and the pump. However, such a system should not be used in two-tank systems as the mixed fluid exiting the pump would be recycled to the water tank, thereby contaminating the water tank and changing the concentration of the chemical that is being sprayed.

Thus, there remains a need for a sprayer that segregates the chemical tank from the water tank but is also more easily plumbed, operated and cleaned. There remains a further need for a variable pressure sprayer wherein the mixed fluid is not recycled to the diluent tank when operating at reduced spraying pressure. The present invention satisfies this as well as other needs.

SUMMARY OF THE INVENTION

In view of the above and in accordance with an aspect of the present invention, the present invention is generally directed to a flow control assembly comprising a manifold configured to be coupled to a positive displacement pump. The manifold defines a fluid conduit having a fluid inlet, a pump supply outlet, a bypass inlet and a mixing chamber between the fluid inlet and both of the pump supply outlet and the bypass inlet.

A fluid input unit is fluidly coupled to the fluid inlet of the manifold. The fluid input unit includes a diluent input configured to receive a fixed flow of a diluent from a diluent tank and a concentrate input configured to receive a selectively adjustable flow of a liquid concentrate from a concentrate tank. The mixing chamber of the fluid conduit is configured to mix the diluent and the liquid concentrate to form a mixed solution to be delivered through the pump supply outlet to a pump inlet on the positive displacement pump.

A bypass unit has a bypass conduit fluidly coupled to the bypass inlet of the manifold and a high pressure input configured to couple to a high pressure output on the positive displacement pump to receive a high pressure mixed fluid therefrom. The bypass unit also includes a bypass valve positionable within the bypass inlet of the manifold between a closed position and an open position. The bypass valve is in the closed position when the high pressure mixed fluid is below a threshold pressure. The bypass valve is in the open position when the high pressure mixed fluid is above the threshold pressure whereby a portion of the high pressure mixed fluid is reintroduced to the mixing chamber of the fluid conduit of the manifold via the bypass conduit and the bypass inlet.

In a further aspect of the present invention, the fluid input unit further includes a concentrate needle valve assembly coupled to the concentrate input whereby the concentrate needle valve assembly is configured to selectively control the adjustable flow of the liquid concentrate from the concentrate tank. The fluid input unit may further include a diluent shut-off valve assembly coupled to the diluent input wherein the diluent shut-off valve is positional between a closed position and an open position. The fixed flow of the diluent is prevented when the diluent shut-off valve is in the closed position and the fixed flow of the diluent is enabled when the diluent shut-off valve is in the open position. The diluent shut-off valve includes a spring-loaded plunger having a spring biasing the plunger to the closed position and may be manually actuatable and include a knob coupled to the plunger to retract the plunger to the open position, or may be mechanically actuatable and include a solenoid coupled to the plunger which operates to retract the plunger to the open position when the solenoid is powered.

In still another aspect of the present invention, the bypass valve may include a spring-loaded plunger having a spring biasing the plunger to the closed position. The bypass unit may further include a knob coupled to the bypass valve whereby actuation of the knob changes the biasing force of the spring-loaded plunger to thereby selectively adjust the threshold pressure. The bypass unit may also include a pressure gage configured to monitor a fluid pressure of the high pressure mixed fluid within the bypass unit and the manifold may include a check valve between the mixing chamber and the fluid inlet to prevent backflow of the mixed solution toward the diluent tank.

In accordance with another aspect of the present invention, the present invention is generally directed to a flow control assembly comprising a manifold configured to be coupled to a positive displacement pump. The manifold defines a fluid conduit having a fluid inlet, a pump supply outlet, a bypass inlet, a mixing chamber between the fluid inlet and both of the pump supply outlet and the bypass inlet, and a check valve between the mixing chamber and the fluid inlet. A fluid input unit is fluidly coupled to the fluid inlet of the manifold. The fluid input unit includes a diluent input configured to receive a fixed flow of a diluent from a diluent tank and a diluent shut-off valve assembly coupled to the diluent input wherein the diluent shut-off valve is positional between a closed position and an open position. The fixed flow of the diluent is prevented when the diluent shut-off valve is in the closed position and enabled when the diluent shut-off valve is in the open position. The diluent shut-off valve may also include a spring-loaded plunger having a spring biasing the plunger to the closed position. The shut-off valve may be manually actuatable and include a knob coupled to the plunger to retract the plunger to the open position, or may be mechanically actuatable and include a solenoid coupled to the plunger which operates to retract the plunger to the open position when the solenoid is powered.

The fluid input unit also includes a concentrate input configured to receive a selectively adjustable flow of a liquid concentrate from a concentrate tank. A concentrate needle valve assembly may be coupled to the concentrate input whereby the concentrate needle valve assembly is configured to selectively control the adjustable flow of the liquid concentrate from the concentrate tank. The mixing chamber of the fluid conduit is then configured to mix the diluent and the liquid concentrate to form a mixed solution to be delivered through the pump supply outlet to a pump inlet on the positive displacement pump. The check valve is configured to prevent backflow of the mixed solution toward the diluent tank.

The manifold also includes a bypass unit having a bypass conduit fluidly coupled to the bypass inlet of the manifold and a high pressure input configured to couple to a high pressure output on the positive displacement pump to receive a high pressure mixed fluid therefrom. The bypass unit includes a bypass valve including a spring-loaded plunger positionable within the bypass inlet between a closed position and an open position. The bypass valve is biased via the spring to the closed position when the high pressure mixed fluid is below a threshold pressure and is driven to the open position when the high pressure mixed fluid is above the threshold pressure whereby a portion of the high pressure mixed fluid is reintroduced to the mixing chamber of the fluid conduit of the manifold via the bypass conduit and the bypass inlet. Also included is a knob coupled to the bypass valve whereby actuation of the knob changes the biasing force of the spring-loaded plunger to thereby selectively adjust the threshold pressure. Also, a pressure gage may be included to monitor fluid pressure of the high pressure mixed fluid within the bypass unit.

In accordance with yet another aspect of the present invention, the present invention is generally directed to a sprayer system comprising a diluent tank configured to hold a diluent, a concentrate tank configured to hold a liquid concentrate, a positive displacement pump having a pump inlet and a high pressure output, and a flow control assembly. The flow control assembly comprises a manifold configured to be coupled to a positive displacement pump. The manifold defines a fluid conduit having a fluid inlet, a pump supply outlet, a bypass inlet and a mixing chamber between the fluid inlet and both of the pump supply outlet and the bypass inlet.

A fluid input unit is fluidly coupled to the fluid inlet of the manifold. The fluid input unit includes a diluent input configured to receive a fixed flow of a diluent from a diluent tank and a concentrate input configured to receive a selectively adjustable flow of a liquid concentrate from a concentrate tank. The mixing chamber of the fluid conduit is configured to mix the diluent and the liquid concentrate to form a mixed solution to be delivered through the pump supply outlet to a pump inlet on the positive displacement pump.

A bypass unit has a bypass conduit fluidly coupled to the bypass inlet of the manifold and a high pressure input configured to couple to a high pressure output on the positive displacement pump to receive a high pressure mixed fluid therefrom. The bypass unit also includes a bypass valve positionable within the bypass inlet of the manifold between a closed position and an open position. The bypass valve is in the closed position when the high pressure mixed fluid is below a threshold pressure. The bypass valve is in the open position when the high pressure mixed fluid is above the threshold pressure whereby a portion of the high pressure mixed fluid is reintroduced to the mixing chamber of the fluid conduit of the manifold via the bypass conduit and the bypass inlet.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
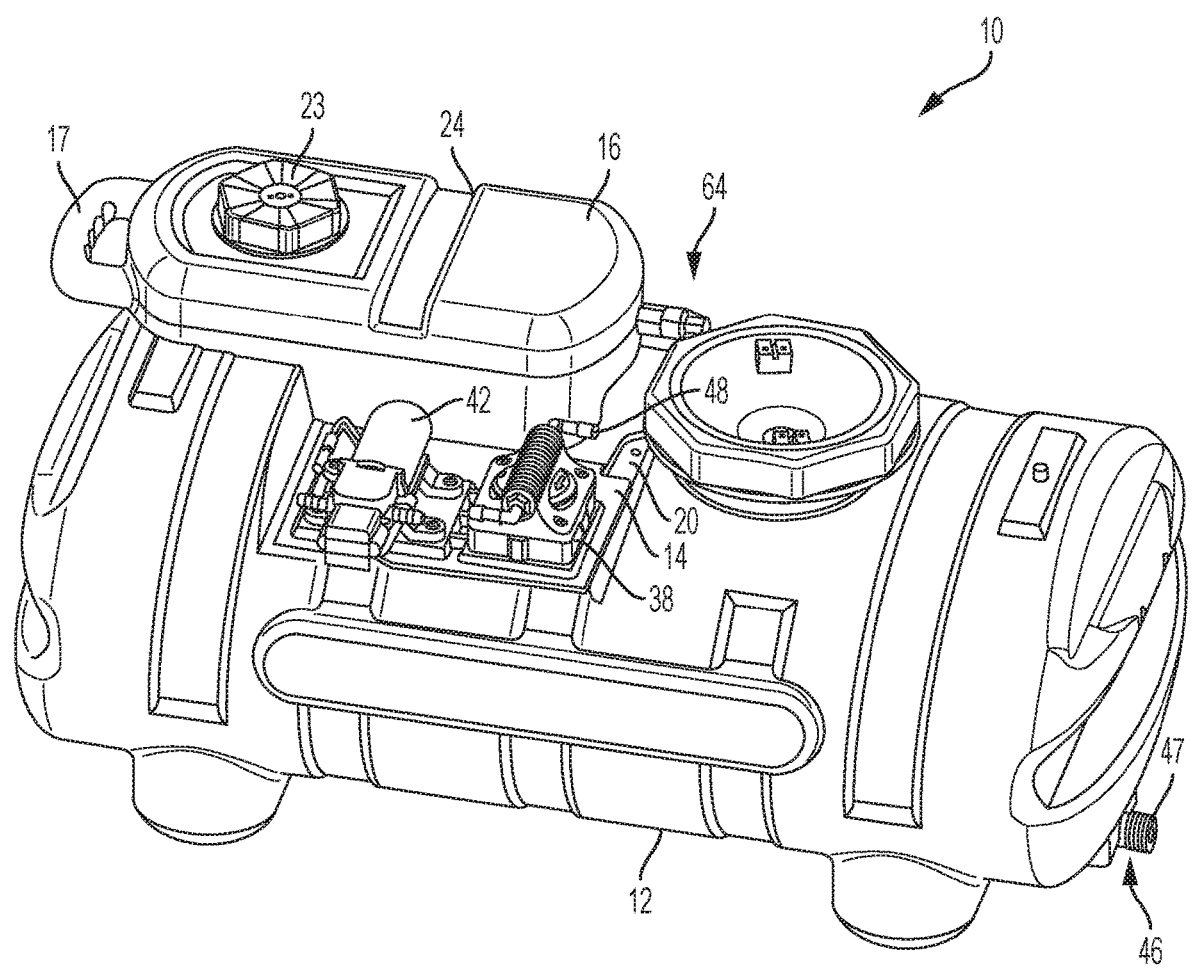
FIG. 1 is a perspective view of a sprayer system.
Figure 2:
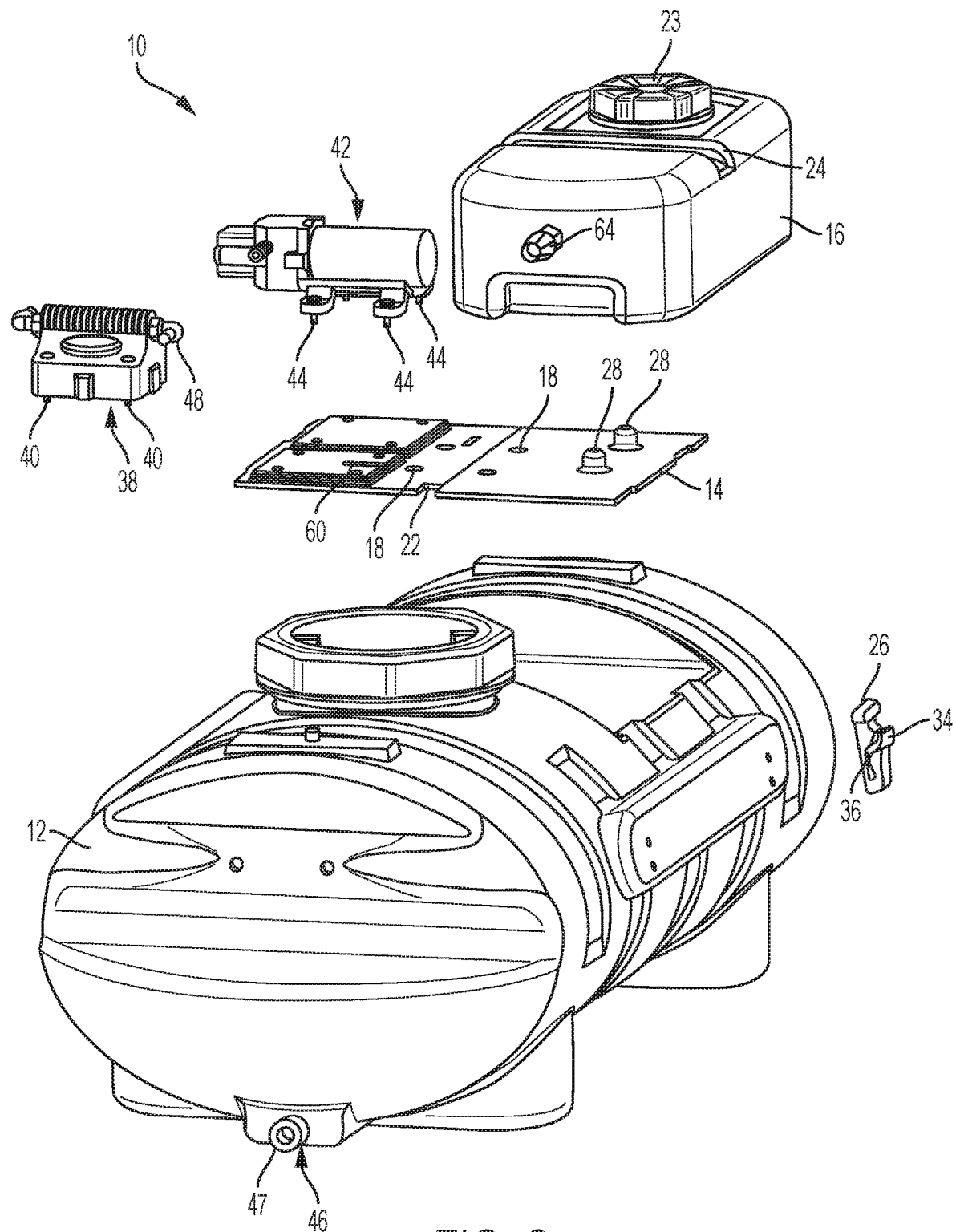
FIG. 2 is an exploded view of the sprayer system shown in FIG. 1.

Referring now to FIGS. 1 and 2, as described within commonly-owned U.S. patent application Ser. No. 15/725,937 (the '937 application), the entirety of which is hereby incorporated by reference, sprayer system 10 may generally comprise a first tank 12, mounting bracket 14, second tank 16, mixing manifold 38 and positive displacement pump 42, such as and without limitation thereto, a diaphragm pump. Mounting bracket 14 may be mounted to first tank 12, such as via mechanical fasteners 18. To provide further support and to resist lateral movement of mounting bracket 14 in the x-z plane, first tank 12 may include a tang 20 configured to reside within a notch 22 defined within mounting bracket 14. Second tank 16 may be mounted to first tank 12 and mounting bracket 14, such as via a strap (not shown). To that end, second tank 16 may include a strap recess 24 configured to receive the strap and first tank 12 may further include a strap tie down clamp 26 whereby movement of second tank 16 in the y-axis is prohibited. To minimize lateral displacement of second tank 16 (i.e., in the x-z plane) mounting bracket 14 may include one or more upwardly extending nodules 28 configured to coincide with matching indentations 30 defined on bottom wall 32 of second tank 16 (see FIG. 6). In this manner, a user may unfasten the strap and lift second tank away from mounting bracket 14 and first tank 12, such as via handle 17, without requiring the use of tools. Strap tie down clamp 26 may further include a wand receiving portion 34 defining a wand receiving recess 36 whereby a spray wand (not shown) may be releasably coupled to sprayer system 10 when the spray wand is not in use. With continued reference to FIGS. 1 and 2, and with additional reference to FIGS. 3 and 4, a mixing manifold 38 may be mounted to mounting bracket 14, such as via mechanical fasteners 40, and positive displacement pump 42 may be mounted to mounting bracket 14 such as via mechanical fasteners 44. In this manner, each of the second tank 16, mixing manifold 38 and positive displacement pump 42 may be individually and separately removed from mounting bracket 14 and first tank 12.

Figure 10:
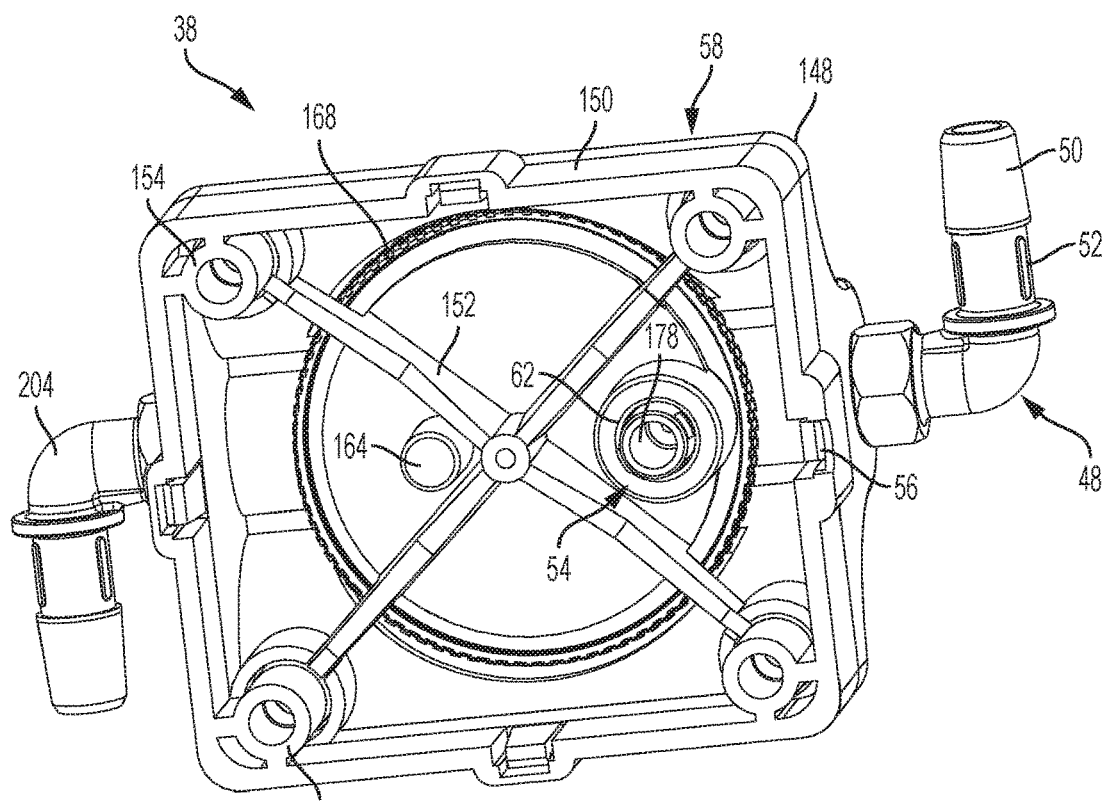
FIG. 10 is a bottom perspective view of the mixing manifold shown in FIG. 9.
Figure 11:
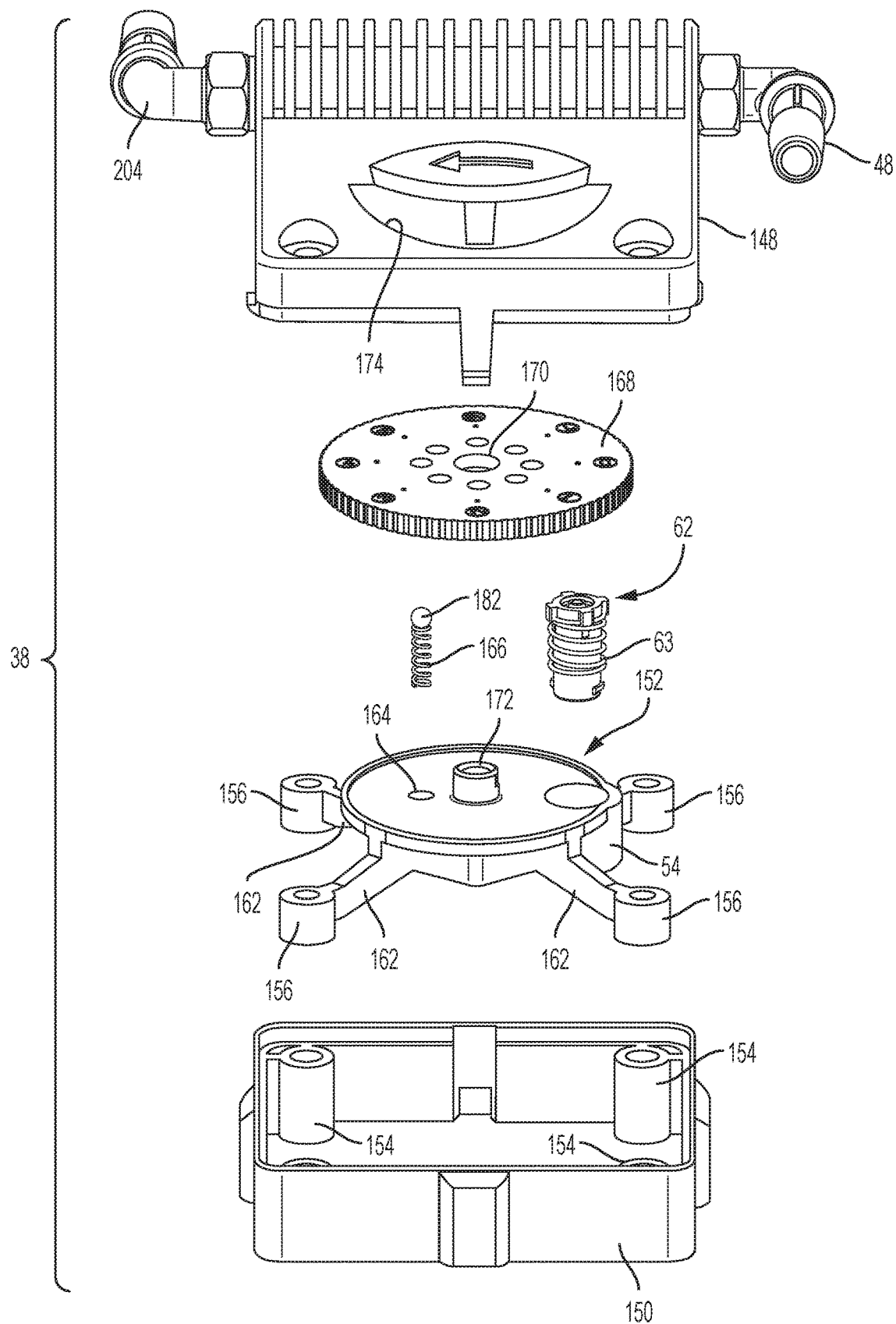
FIG. 11 is a top front exploded view of the mixing manifold shown in FIGS. 9 and 10.
Figure 12:
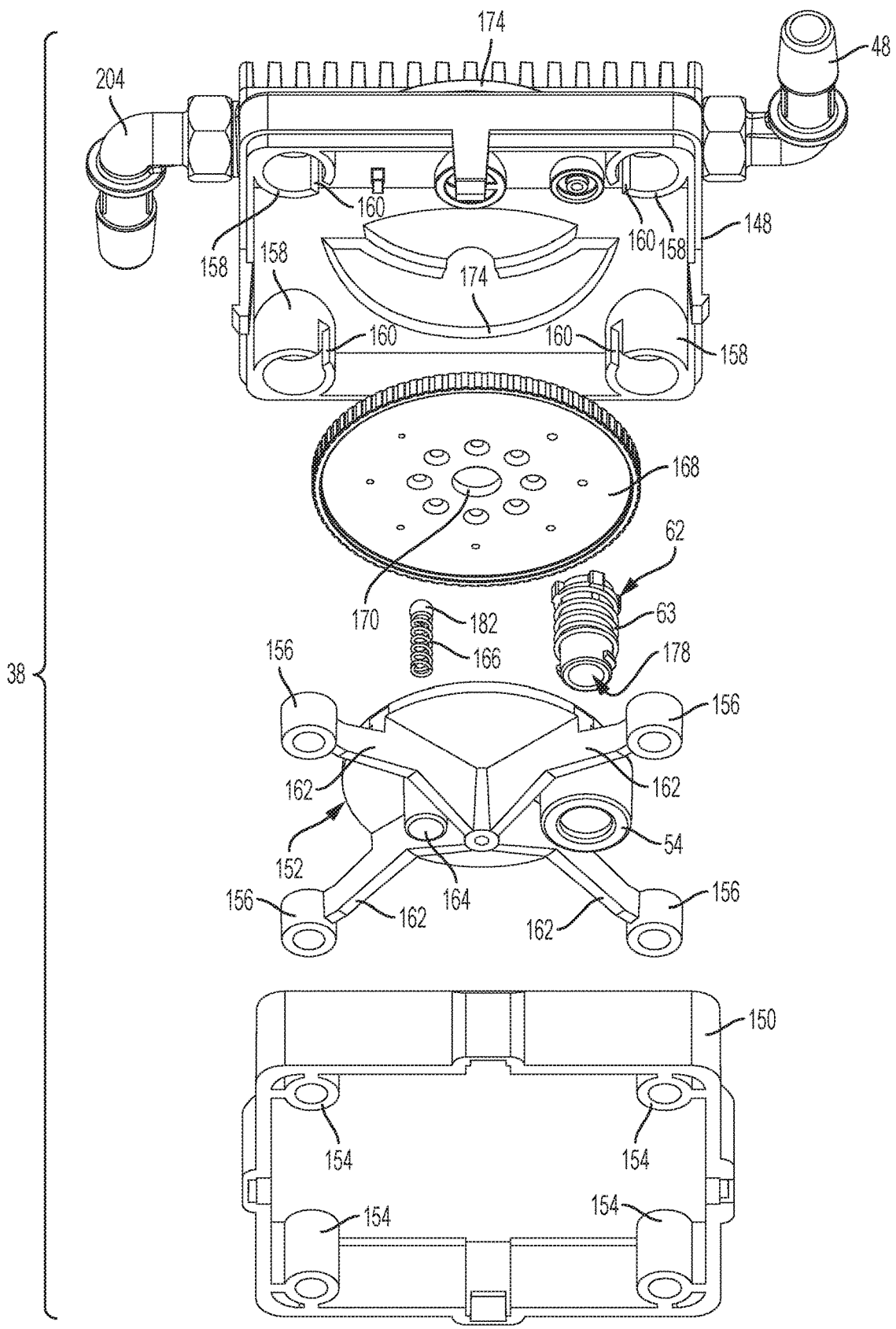
FIG. 12 is a bottom front exploded view of the mixing manifold shown in FIGS. 9 and 10.

In operation, first tank 12 includes a diluent outlet 46 having a diluent fitting 47 configured to receive one end of diluent tubing (not shown) in a substantially fluid-tight seal. The opposing end of the diluent tubing is mounted onto a first inlet fitting 48 of mixing manifold 38 (see also FIGS. 9-13). First inlet fitting 48 may include a tapered nipple 50 and ribbed portion 52 so as to snuggly receive the diluent tubing thereon in a substantially fluid-tight seal. An optional hose clamp (not shown) may also be used to more securely clamp the diluent tubing to ribbed portion 52. Mixing manifold 38 may further include a second inlet 54 configured to receive concentrate tubing (not shown) from second tank 16. As shown most clearly in FIGS. 4 and 10, mixing manifold 38 may include a notch 56 proportioned to permit passage of concentrate tubing through housing 58 of mixing manifold 38. Mounting bracket 14 may also include a recess 60 to accommodate passage of the concentrate tubing (see FIGS. 2 and 4). Thus, a first end of the concentrate tubing may be mounted to fitment 62 housed within second inlet 54. The concentrate tubing may then extend toward second tank 16 wherein the opposing end of the concentrate tubing is mounted to second tank 16 via concentrate outlet fitting 64.

Figure 5:
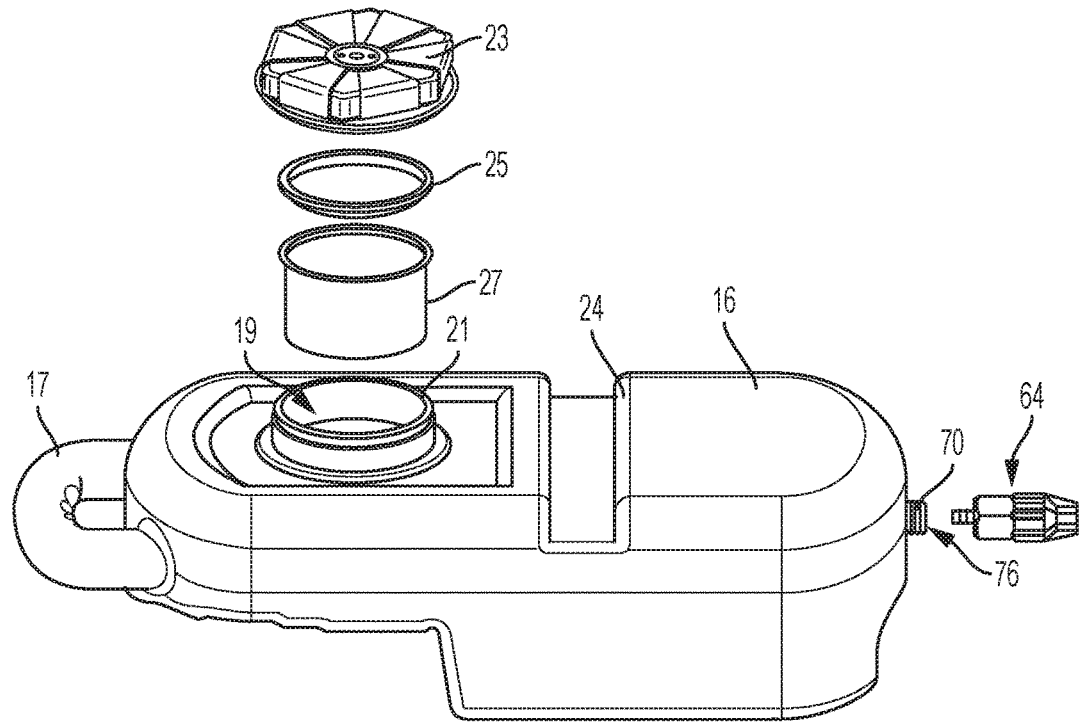
FIG. 5 is an exploded view of a liquid concentrate tank used within the sprayer system shown in FIG. 1.
Figure 6:
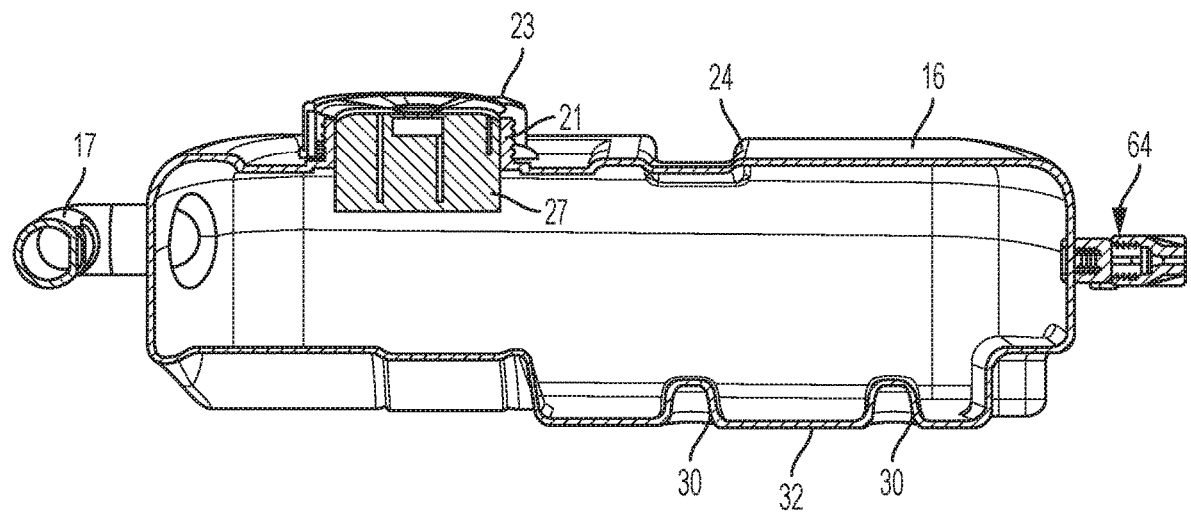
FIG. 6 is a cross section view of the liquid concentrate tank used within the sprayer system shown in FIG. 1.

With reference to FIGS. 5 and 6, second tank 16 may be filled with a selected fluid concentrate through tank opening 19 defined by a threaded mouth portion 21. A cap 23 may be removably threaded onto mouth portion 21 so as to seal second tank 16. An optional O-ring 25 may also facilitate a fluid-tight seal between second tank 16 and cap 23. To prevent clogging of downstream plumbing components, mouth portion 21 may further receive filter element 27 therein. When filling second tank 16 with fluid concentrate, the fluid will pass through filter element 27 whereby particulate matter larger than the pore size of the filter element will be strained out of the fluid. Accordingly, the pore size of filter element 27 should be selected so as to be smaller than the internal diameter of the smallest diameter downstream component, such as disc 168 which will be discussed in greater detail below.

Figure 7:
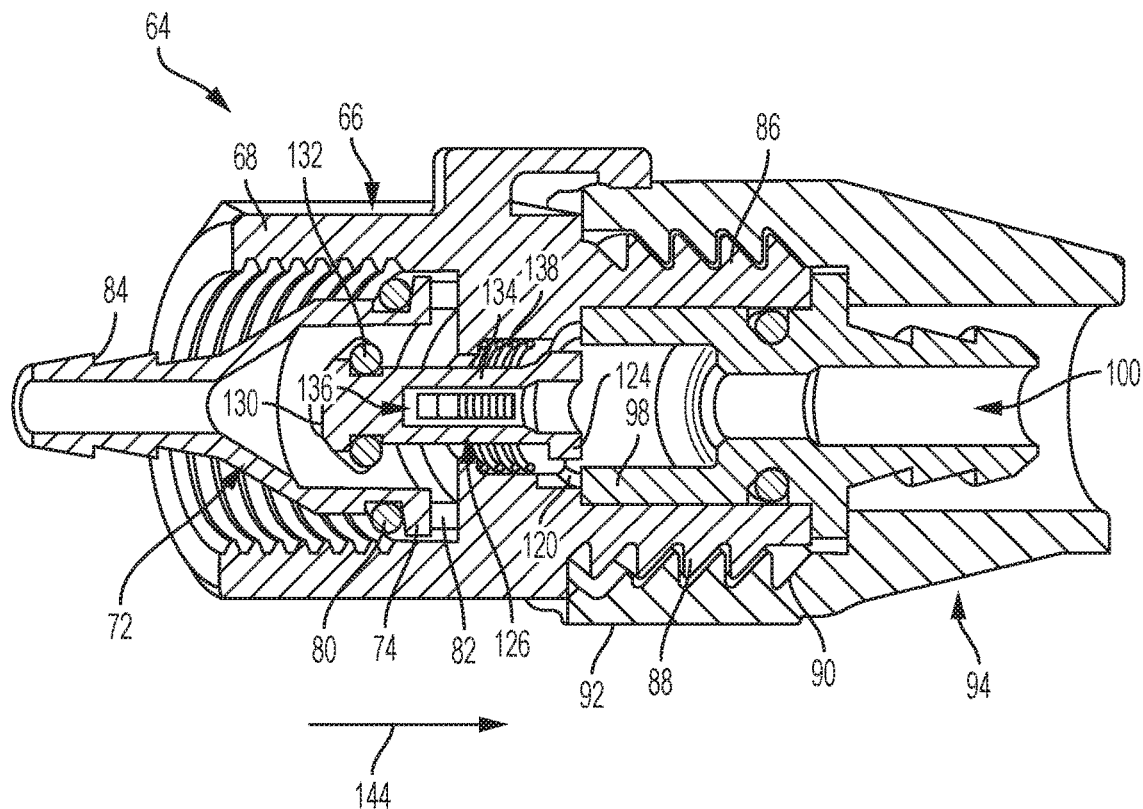
FIG. 7 is a cross section view of a tubing fixture used with the liquid concentrate tank shown in FIG. 5.
Figure 8:
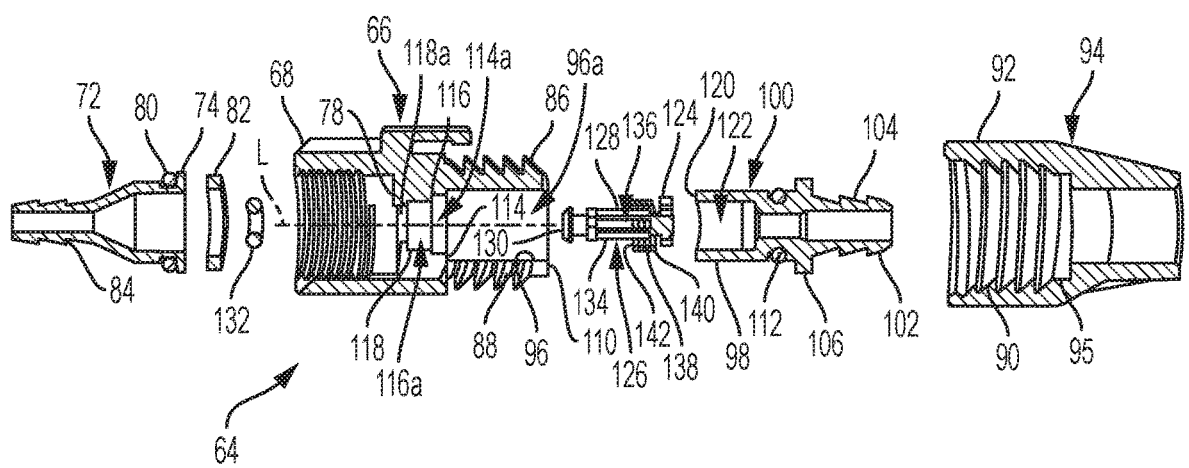
FIG. 8 is an exploded cross section view of the tubing fixture shown in FIG. 7.
Figure 9:
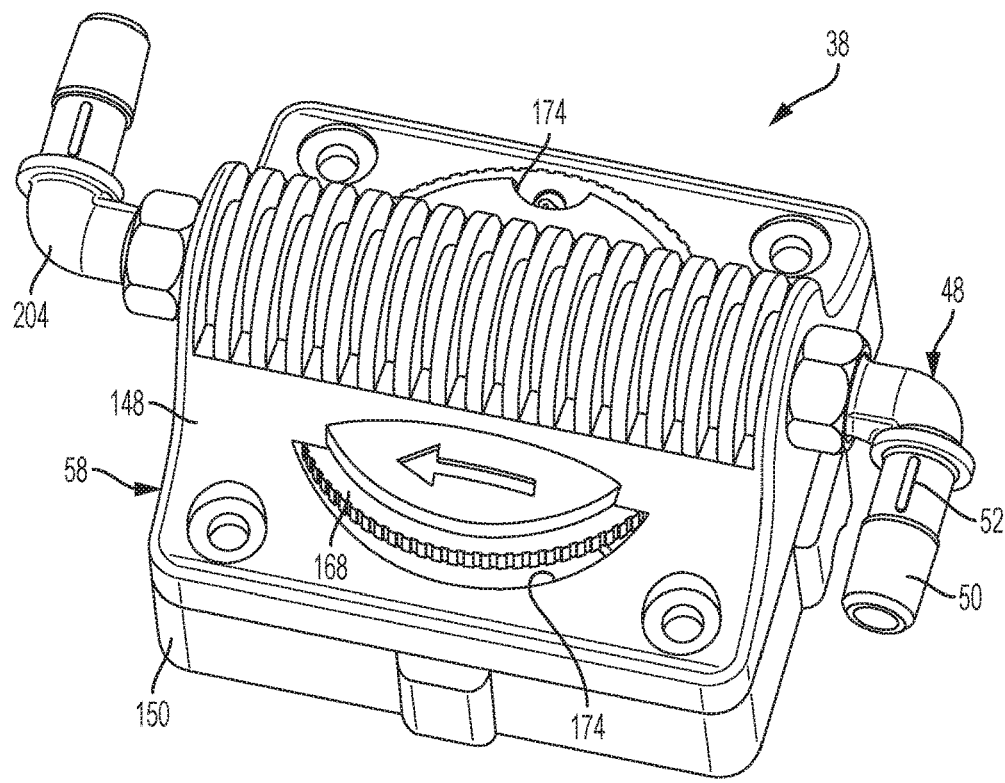
FIG. 9 is a top perspective view of a mixing manifold used within the sprayer system shown in FIG. 1.

With reference to FIGS. 7 and 8, to facilitate tool-less removal of second tank 16 from mounting bracket 16 and mixing manifold 38, concentrate outlet fitting 64 may be a quick disconnect coupling generally comprised of a fitment housing 66 having a first end 68 configured to be threadably coupled to a corresponding tank fitment 70 defined on second tank 16 (see FIG. 5). First end 68 of fitment housing 66 may also be configured to receive a tank tubing coupling 72 whereby tank tubing coupling 72 includes a flanged end 74 proportioned to abut against mouth opening 76 of tank fitment 70 such that tank tubing coupling 72 is entrapped between mouth opening 76 and stepped wall 78 of fitment housing 66 when fitment housing 66 is threaded onto tank fitment 70. To promote a fluid-tight seal between tank fitment 70 and fitment housing 66, one or more seals, such as O-rings 80, 82 may be included. The opposing end of tank tubing coupling 72 may include one or more barbs 84 dimensioned to snuggly receive a concentrate pick-up tube (not shown) which may extend from tank tubing coupling 72 to proximate bottom wall 32 of second tank 16. In this manner, liquid concentrate may be drawn from second tank 16 as will be described in greater detail below.

With continued reference to FIGS. 7 and 8, second end 86 of fitment housing 66 may include male threads 88 configured to threadably engage female threads 90 defined within a first end 92 of tubing nut 94. Second end 86 may further define a bore 96 dimensioned to receive a first end 98 of a concentrate tubing coupling 100 therein upon threaded engagement of tubing nut 94 with fitment housing 66. The opposing end 102 of concentrate tubing coupling 100 may include one or more barbs 104 dimensioned to snuggly receive the opposing end of the concentrate tubing as described above. Annular flange 106 on concentrate tubing coupling may engage seat portion 95 of tubing nut 94 such that tubing nut 94 may permit mounting of concentrate tubing coupling 100 to second tank 16 with minimal, if any, twisting of the concentrate tubing as tubing nut 94 is rotatably threaded onto male threads 88. To assist in properly seating concentrate tubing coupling 100 within fitment housing 66, annular flange 106 may also be dimensioned to abut against the mouth opening 110 of bore 96 when tubing nut 94 is fully tightened. An O-ring seal 112 may also promote a fluid-tight seal between concentrate tubing coupling 100 and bore 96 of fitment housing 66.

As discussed in the '937 application, bore 96 may be further include a series of steps 114, 116, 118 thereby defining bore regions 96a, 114a, 116a, 118a. Concentrate tubing coupling 100 may reside within bore region 96a such that terminal end 120 of first end 98 of concentrate tubing coupling 100 may seat against step 114. The wall thickness of terminal end 120 may be selected so that internal bore 122 of concentrate tubing coupling 100 is slightly smaller than the diameter of bore region 114a. In this manner, terminal end 120 partially occludes bore region 114a whereby flanged end 124 of plug member 126 may be engaged by concentrate tubing coupling 100 as tubing nut 94 is threaded onto fitment housing 66. Bore region 114a may be proportioned to receive flanged end 124 while step 116 has a smaller diameter than flanged end 124 whereby flanged end 124 is precluded from entering bore region 116a. Plug member 126 may further include a body portion 128 dimensioned to pass through and extend within bore regions 116a, 118a before terminating at a second end 130. Second end 130 of plug member 126 may include an O-ring seal 132 having an external diameter greater that the diameter of bore region 118a. Body portion 128 may be comprised of a plurality of spaced-apart spindles 134 configured to define open slots 136 therebetween so as to promote fluid travel through plug member 126, as will be discussed in greater detail below.

Plug member 126 may translate along longitudinal axis L of fitment housing 66 so as to selectively plug or unplug bore region 118a and control outflow of liquid concentrate from second tank 16 to mixing matrix 38. To that end, as shown in FIG. 7, tubing nut 94 may be threadably coupled to fitment housing 66 to thereby secure concentrate tubing coupling 100 therein. Terminal end 120 of concentrate tubing coupling 100 engages flanged end 124 of plug member 126 so as to direct second end 130 a spaced distance from bore region 118a. In this position, fluid may flow from second tank 16 through tank tubing coupling 72, fitment housing 66 and the concentrate tubing coupling before passing to mixing manifold 38.

Fitment housing 66 may further include a biasing member, such as compression spring 138, configured to engage flanged end 124 at a first end 140 and step 118 at second end 142. In this manner, threading of tubing nut 94 and concentrate tubing coupling 100 may compress spring 138 to thereby cause potential energy to be stored within spring 138. Unthreading of tubing nut 94 and removal of concentrate tubing coupling 100 from fitment housing 66 enables spring 138 to release the stored potential energy so as to cause plug member 126 to translate along longitudinal axis L generally in the direction generally indicated by arrow 144. Plug member 126 will continue to translate until O-ring 132 engages surface 146 of fitment housing 66 whereby O-ring 132 and second end 130 of plug member 126 occlude bore region 118a. In this manner, fluid concentrate may no longer flow into concentrate tubing coupling 100. As a result, second tank 16 may be rendered substantially leak proof. Second tank 16 may then be removed from mounting bracket 14 as described above and stored with minimal to no loss of liquid concentrate.

Following removal of second tank 16 as described above, a replacement second tank (not shown) may be mounted to mounting bracket 14. Tubing nut 94 and concentrate tubing coupling 100 may then be threaded onto a fitment housing (similar to fitment housing 66) on the replacement second tank as described above. As a result, the plug member within the fitment housing may be opened so as to allow transfer of the alternative liquid concentrate within the replacement second tank to mixing manifold 38 as described above. A replacement second tank may be filled with water so as to enable flushing of the system between chemicals that are to be sprayed, thereby reducing cross-contamination or misapplication of the chemicals. Thus, sprayer system 10 may be configured to selectively spray any number of various liquid concentrates requiring only the removal and replacement of selected second tanks and remounting of tubing nut 94 and concentrate tubing coupling 100. Respective second tanks may be stored with little to no threat of leakage of respective liquid concentrates contained therein, thereby reducing waste of the concentrates. Moreover, user exposure to a concentrate is minimized as the second tank does not need to be emptied, washed and refilled every time a new liquid concentrate desired to be sprayed.

Turning now to FIGS. 9-13, various views of mixing manifold 38 are shown. As can be seen, housing 58 of mixing manifold 38 may be generally comprised of upper 148 and lower 150 housing subunits. Manifold support member 152 may be interposed between subunits 148, 150. To that end, the interior corners of lower housing subunit 150 may include nodules 154 dimensioned such that respective feet 156 on manifold support member 152 seat upon respective nodules 154. Upper housing subunit 148 may include respective lobes 158 dimensioned to receive a respective foot 156 therein. Each lobe 158 may also include a notch 160 for permitting passage therethrough of a respective leg 162 on manifold support member 152. In this manner, manifold support member 152 may be securely seated within manifold housing 58 and be constrained so as to prevent lateral and torsional movement of manifold support member 152. As described above, manifold support member 152 includes second inlet 54 configured to receive fitment 62. Manifold support member 152 may further include a spring well 164 dimensioned to receive a stop spring 166, as will discussed in greater detail below.

Figure 14:
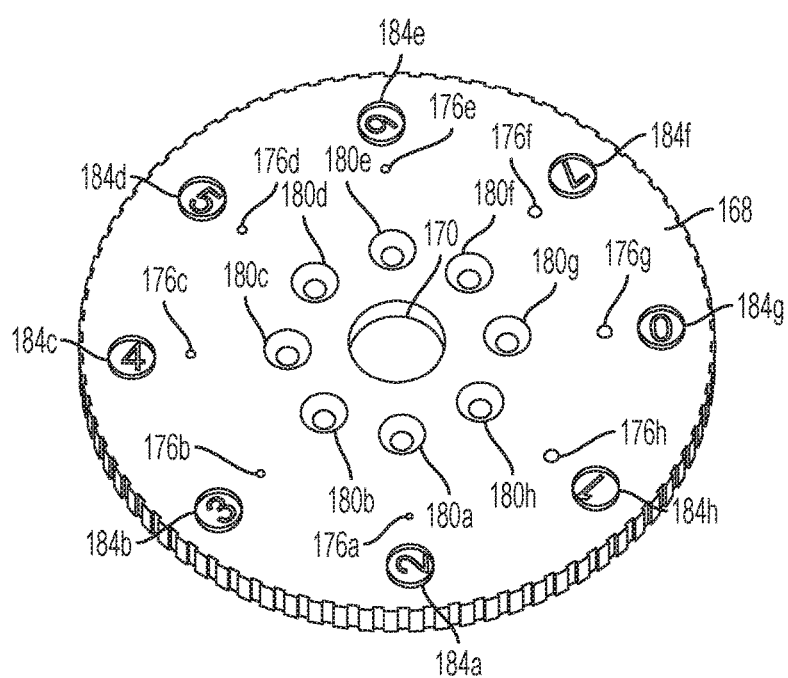
FIG. 14 is an isolated view of a disc used within the mixing manifold shown in FIGS. 9 through 13.

Mixing manifold 38 may further include disc 168 rotatably mounted atop manifold support member 152 whereby center hole 170 defined by disc 168 receives post 172 formed on manifold support member 152. Disc 168 may then be capped by upper housing subunit 148 wherein upper housing subunit 148 includes one or more openings 174 therethrough such that a portion of the outer circumference of disc 168 may be engaged by a user so as to selectively rotate disc 168 about post 172. With additional reference to FIG. 14, disc 168 may further define an outer annular series of spaced-apart through-holes, such as flow metering holes 176a-176h. Each of flow metering holes 176a-176h may have a slightly larger diameter than the immediately preceding flow metering hole. In operation one of holes 176a-176h is aligned with internal bore 178 defined by fitment 62. Fitment spring 63 may urge fitment 62 against disc 168 so as to create and maintain a substantially fluid-tight seal between fitment 62 and disc 168. In this manner, a user may selectively control the volume of liquid concentrate that may pass through disc 168, as will be discussed in greater detail below.

Disc 168 may also further define an inner annular series of spaced apart through-holes, such as chamfered spring stop holes 180a-180h. Each respective spring stop hole 180a-180h is configured to align radially with its respective flow metering hole 176a-176h. In operation, a selected one of holes 180a-180h is aligned with spring well 164 whereby a positive stop member, such as ball bearing 182, seats within a portion of the selected spring stop hole 180a-180h through urging of stop spring 166 resident within spring well 164. In this manner, a user may receive feedback indicating proper alignment of the selected flow metering hole 176a-176h upon seating of ball bearing 182. To change the amount of liquid concentrate added to the diluent stream, a user may rotate disc 168 whereby disc 168 may apply downward force against ball bearing 182 so as to compress stop spring 166 within spring well 164. Disc 168 may then be further rotated until the desired flow metering hole 176a-176h is aligned with internal bore 178 of fitment 62 such that ball bearing 182 seats within the desired spring stop hole 180a-180h. As most clearly shown in FIG. 14, disc 168 may also include respective indicia 184a-184h proximate a respective flow metering hole 176a-176h. Indicia 184a-184h may correlate with the respective diameter of respective flow metering holes 176a-176h so as to provide visual indication to the user as to which of the respective flow metering holes 176a-176h is currently aligned with internal bore 178 of fitment 62.

Figure 13:
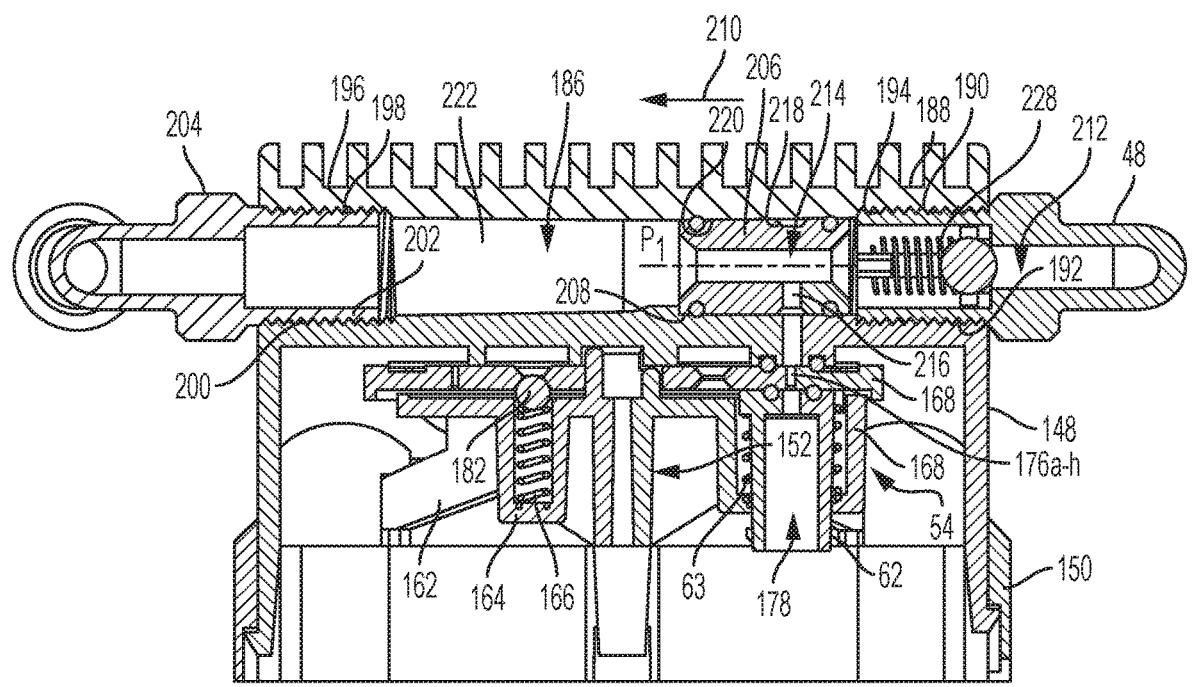
FIG. 13 is a cross section view of the mixing manifold, taken generally along line 13-13 in FIG. 9.

As seen most clearly in FIG. 13, mixing manifold 38 may include a fluid channel 186 wherein a first end 188 of fluid channel 186 may define female threads 190 configured to matingly receive corresponding male threads 192 defined by manifold terminus 194 of first inlet fitting 48. The opposing second end 196 of fluid channel 186 may similarly define female threads 198 configured to matingly receive corresponding male threads 200 on manifold terminus 202 of manifold outlet fitting 204. A flow plug 206 may be interposed within fluid channel 186 adjacent the internal extent of female threads 190. Fluid channel 186 may further define a step 208 so as to provide a positive stop to insertion of flow plug 206 in the direction generally indicated by arrow 210. In this manner, bore 212 of first inlet fitting 48 may align with the longitudinal axis P of longitudinal bore 214 of flow plug 206 whereby a constant volume of diluent may be received from first tank 12 after flowing through first inlet fitting 48 into flow plug 206.

As further seen in FIG. 13, flow plug 206 may further include a radially extending bore 216 which may be configured to fluidly align with one of flow metering holes 176a-176h and internal bore 178 of fitment 62. In this manner, a user selected volume of liquid concentrate may be received from second tank 16, wherein the selected volume of liquid concentrate is then mixed with, and diluted by, the constant volume of diluent being received through first inlet 48 as described above. Flow plug 206 may also define an annular groove 218 configured to define a fluid tight channel with internal wall surface 220 of mixing manifold 38. Annular groove 218 coincides with radially extending bore 216 such that fluid concentrate may still pass through radially extending bore 216 into longitudinal bore 214 should radially extending bore 216 be misaligned with one of flow metering holes 176a-176h and internal bore 178. Fluid channel 186 may further define a mixing chamber portion 222 which may further promote mixing of the diluent and fluid concentrate prior to outputting the mixed fluid through manifold outlet fitting 204.

Figure 3:
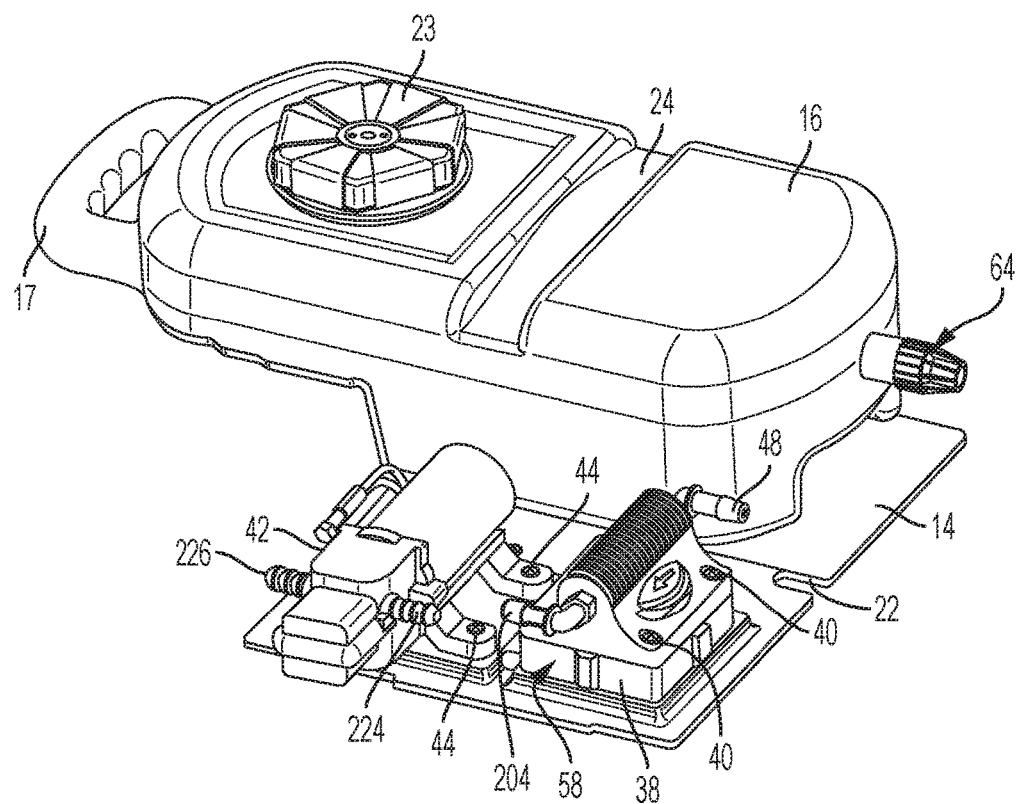
FIG. 3 is a front perspective view of the sprayer system shown in FIG. 1 with the diluent tank removed.
Figure 4:
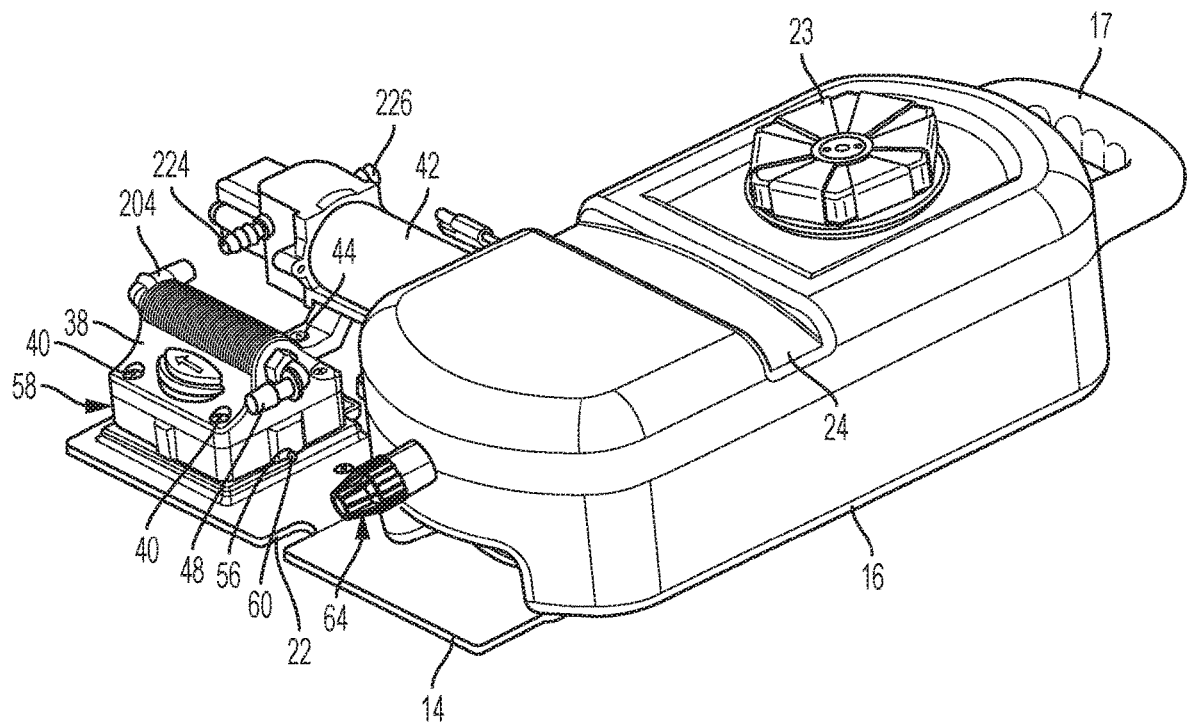
FIG. 4 is a rear perspective view of the sprayer system shown in FIG. 3.

With reference to FIGS. 3 and 4, manifold outlet tubing (not shown) may fluidly couple manifold outlet fitting 204 with positive displacement pump suction port 224. In this manner, upon a suction stroke of positive displacement pump 42, mixed fluid is drawn into pump 42 from mixing manifold 38. As described above, the mixed fluid is comprised of a constant volume of diluent into which is charged a user-selected volume of liquid concentrate. Thus, on a pressure stroke of pump 42, the mixed fluid is forced out of pressure port 226 of positive displacement pump 42. Pressure port 226 may be fluidly coupled to a spray device, such as a spray wand or boom sprayer (not shown). To prevent backflow of mixed fluid through first inlet fitting 48 into first tank 12, first inlet fitting 48 may include a check valve 228 (see FIG. 13). In this manner, cyclical operation of positive displacement pump 42 will alternately draw mixed fluid from mixing manifold 38 and discharge this mixed fluid through an attached sprayer whereby the concentration of the fluid concentrate dilution is selected, and easily modified by, the user through setting of disc 168. In should be understood by those skilled in the art that positive displacement pump 42 may be powered by any suitable power source, such as a dedicated battery or through wiring pump 42 to the battery of the vehicle (e.g., ATV or golf cart).

Figure 15:
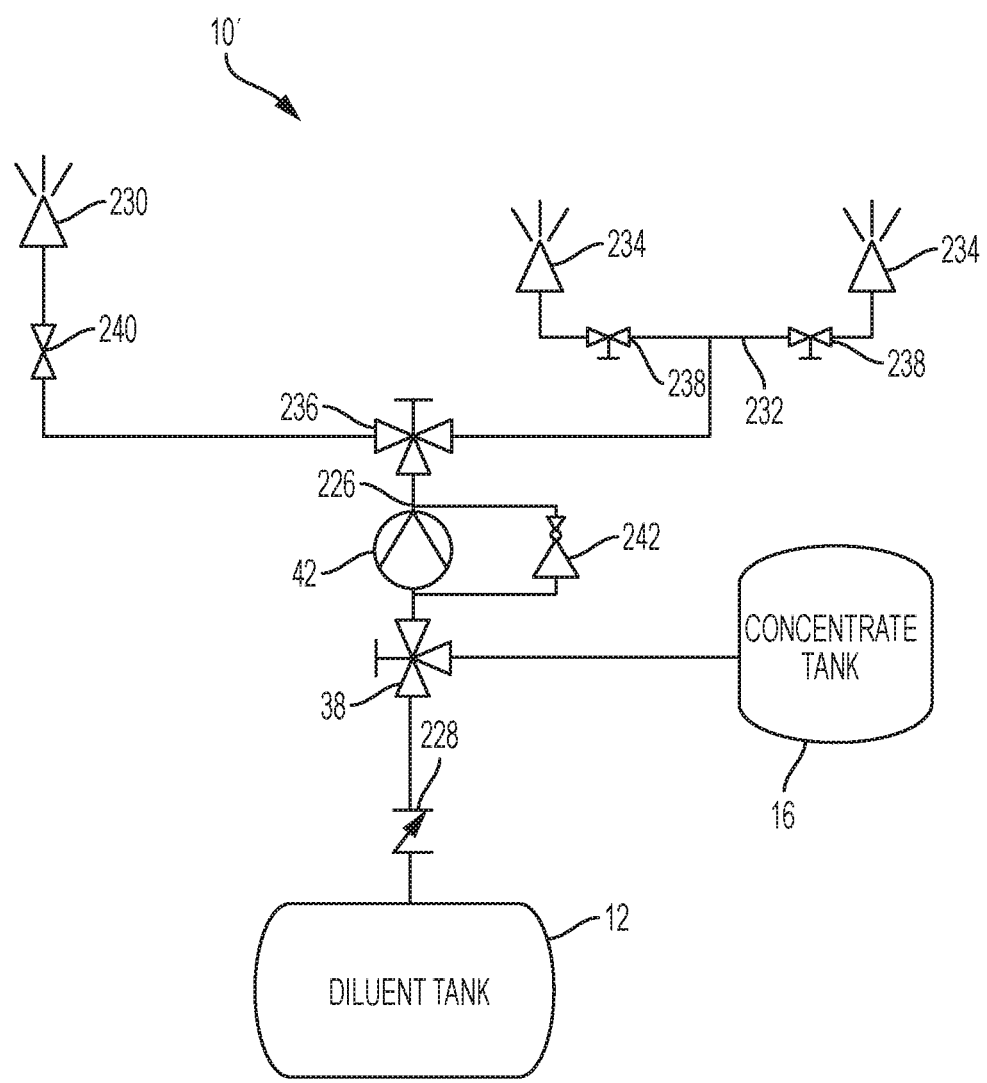
FIG. 15 is a schematic view of a pressure bypass system suitable for use within a variable pressure sprayer system.

Turning now to FIG. 15, a sprayer system 10' may be configured to operate as a variable pressure sprayer. Sprayer system 10' may include first tank 12 and second tank 16 each fluidly coupled to mixing manifold 38 as described above with regard to sprayer system 10. Check valve 228 may be interposed between mixing manifold 38 and first tank 12 to prevent backflow of mixed fluid into first tank 12, also as described above. Mixed fluid may be drawn from mixing manifold 38 through operation of positive displacement pump 42 whereby the mixed fluid is output through pressure port 226. The mixed fluid may then be selectively delivered to a spray nozzle 230 (such as a handheld sprayer) or to a boom 232 upon which are mounted a plurality of boom nozzles 234.

Flow to spray nozzle 230 or boom 232 may be selectively controlled by a selector valve 236. Flow control at each boom nozzle 234 may also be further controlled by respective ball valve 238. Spray nozzle 230 may also include a pressure reducing valve 240 which is metered to control the fluid pressure of the mixed fluid entering spray nozzle 230 so as to minimize or prevent damage to spray nozzle 230.

Positive displacement pump 42 may include a pressure bypass recirculation loop 242 fluidly coupling pressure port 226 with suction port 224. Pressure bypass recirculation loop 242 may operate to decrease the fluid pressure of the mixed fluid being delivered to spray nozzle 230 while also maintaining segregation of the mixed fluid from either first tank 12 or second tank 16. Pressure bypass recirculation loop 242 may be either internal to positive displacement pump 42 of may be en external pressure bypass loop around positive displacement pump 42.

Figure 16:
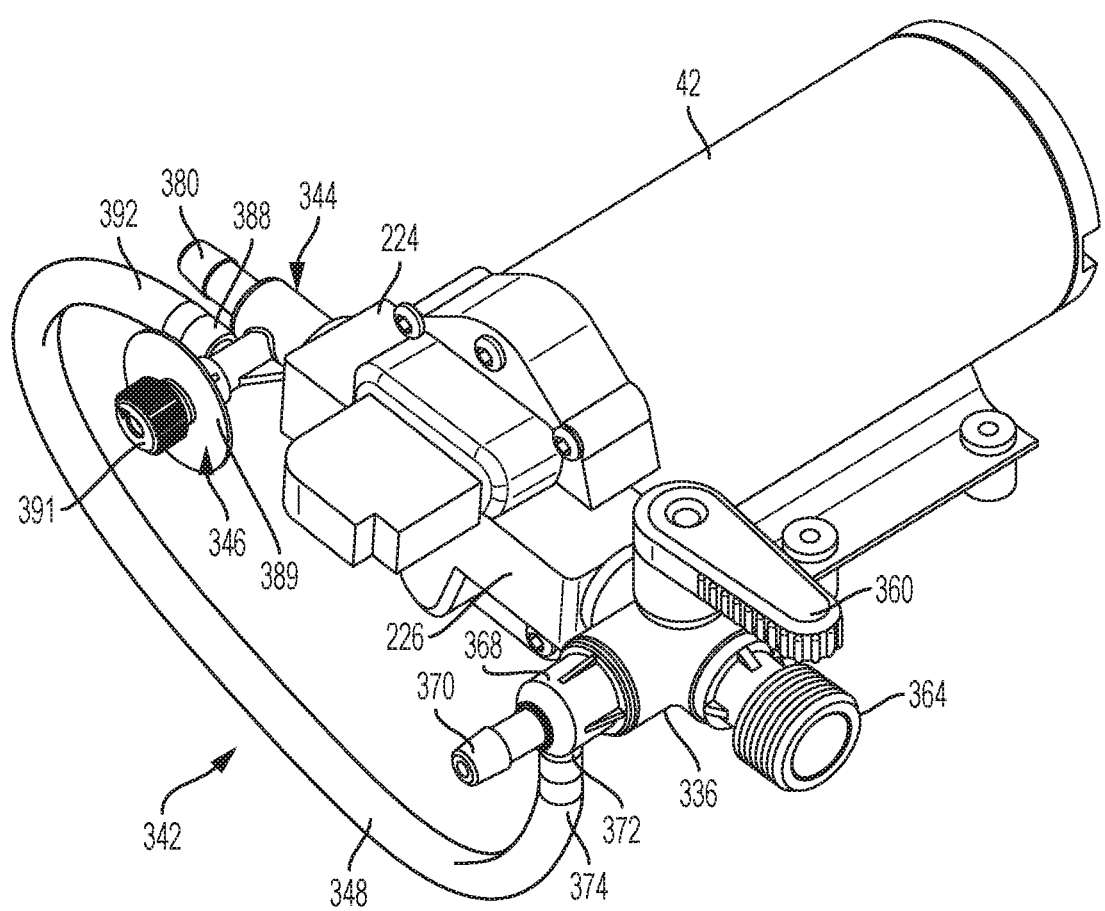
FIG. 16 is a perspective view of an external bypass circuit suitable for use within a variable pressure sprayer system.

Turning now to FIGS. 16 through 21 and with particular reference to FIG. 16 as described within commonly-owned U.S. patent application Ser. No. 15/952,416, now U.S. Pat. No. 10,413,922, the entirety of which is hereby incorporated by reference, an exemplary embodiment of an external bypass circuit 342 is shown mounted onto positive displacement pump 42. External bypass circuit 342 generally comprises a input flow fitting 344 including an adjustable needle valve assembly 346 (see also FIGS. 20 and 21), a flow diverter valve 336 (see also FIGS. 17 through 19), and a bypass line 348 fluidly coupling the flow diverter valve to the input flow fitting 344. As will be discussed in greater detail below, flow diverter valve 336 may operate similarly to selector valve 236 described above so as to direct flow to either a high flow output, such as a boom sprayer 232, or a low flow output, such as a handheld wand 230 (see FIG. 15). As shown in FIG. 16, input flow fitting 344 is coupled to suction (inlet) port 224 of positive displacement pump 42 while flow diverter valve 336 is coupled to pressure (output) port 226. It should be noted that, while shown as being directly coupled to their respective ports 224, 226, input flow fitting 344 and flow diverter valve 336 may be indirectly coupled to their respective ports 224, 226, such as through intermediate hoses, tubes or other plumbing hardware.

Figure 17:
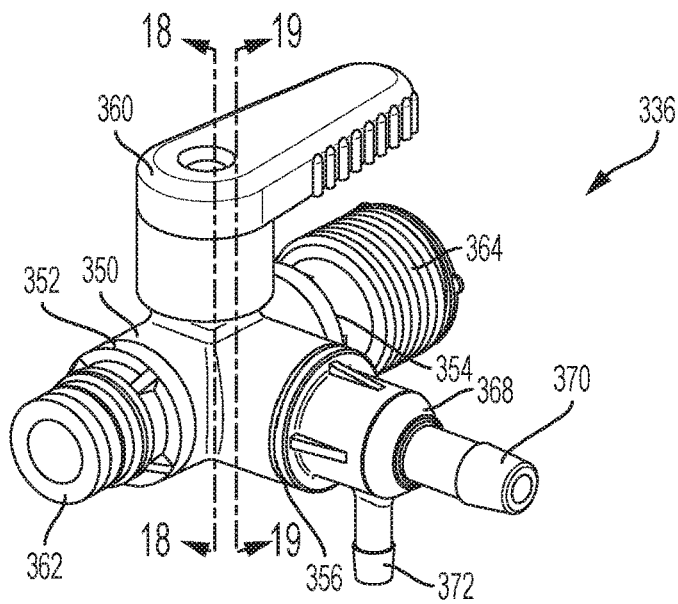
FIG. 17 is a perspective view of a flow diverter valve suitable for use within the external bypass circuit shown in FIG. 16.
Figure 18:
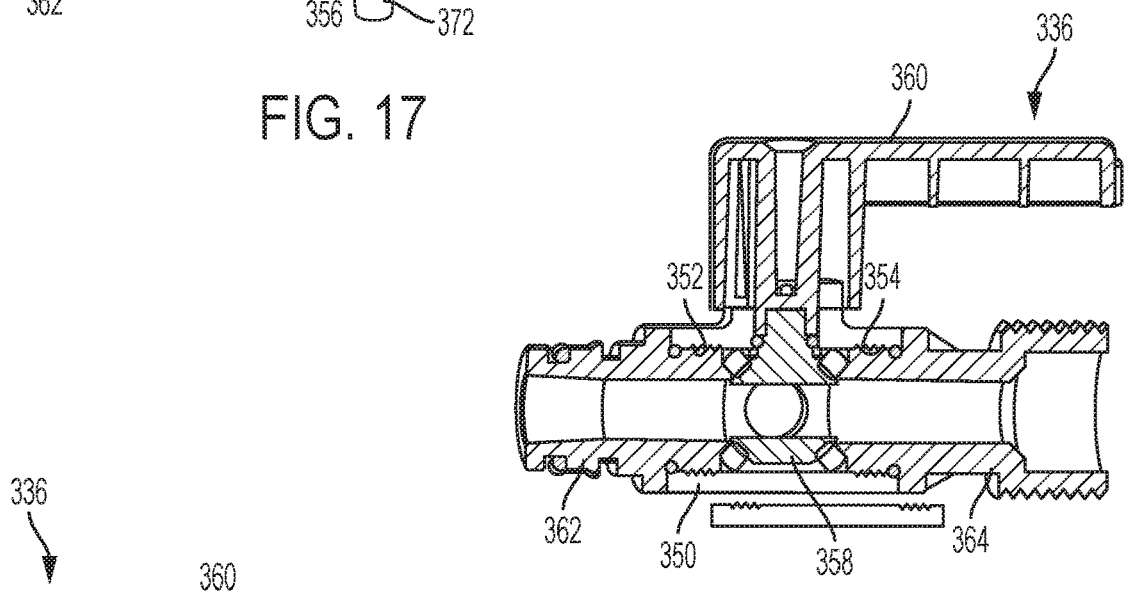
FIG. 18 is a longitudinal cross section of the flow diverter valve shown in FIG. 17, taken generally along line 18-18 within in FIG. 17.
Figure 19:
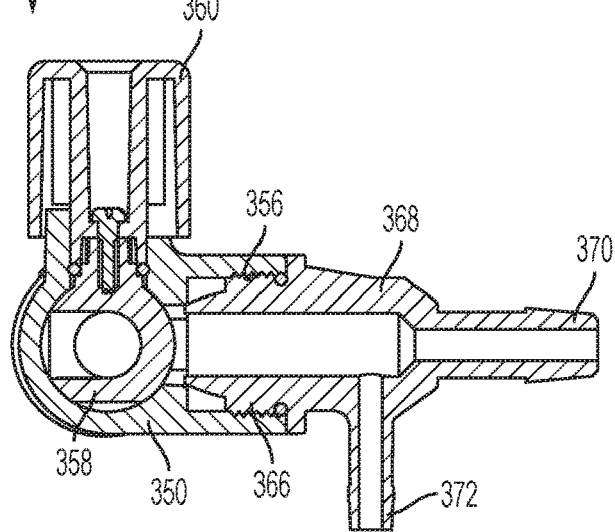
FIG. 19 is a lateral cross section of the flow diverter valve shown in FIG. 17, taken generally along line 19-19 within in FIG. 17.

Turning now to FIGS. 17 through 19, flow diverter valve 336 may include a generally T-shaped valve body 350 defining an inlet orifice 352, high flow outlet orifice 354 and low flow outlet orifice 356. Resident within the junction of the intersecting arms of valve body 350 is a ball valve 358. A handle 360 may be used to selectively rotate ball valve 358 so as to control fluid flow from inlet orifice 352 to either high flow outlet orifice 354 or low flow outlet orifice 356 as desired. Inlet orifice 352 may threadably receive quick-connect fitting 362 whereby flow diverter valve 336 may be releasably coupled to pressure port 226 of pump 42. High flow outlet orifice 354 may threadably receive a high pressure fitting 364 adapted to receive a corresponding fitting (not shown) mounted onto the high flow output (e.g., boom sprayer 232). Low flow outlet orifice 356 may threadably receive a first arm 366 of generally T-shaped bypass fitting 368. A second end 370 of bypass fitting 368 may be adapted to receive tubing or a corresponding fitting (not shown) mounted onto the low flow output (e.g., handheld wand 230) so as to deliver a spray portion of the fluid to the low flow output. Additionally, bypass arm 372 of bypass fitting 368 may be configured to receive a first end 374 of bypass line 348 so as to deliver a bypass portion of the fluid to input flow fitting 344. It should be noted that discussion of the seals and gaskets used to form water-tight connections has been omitted.

Figure 20:
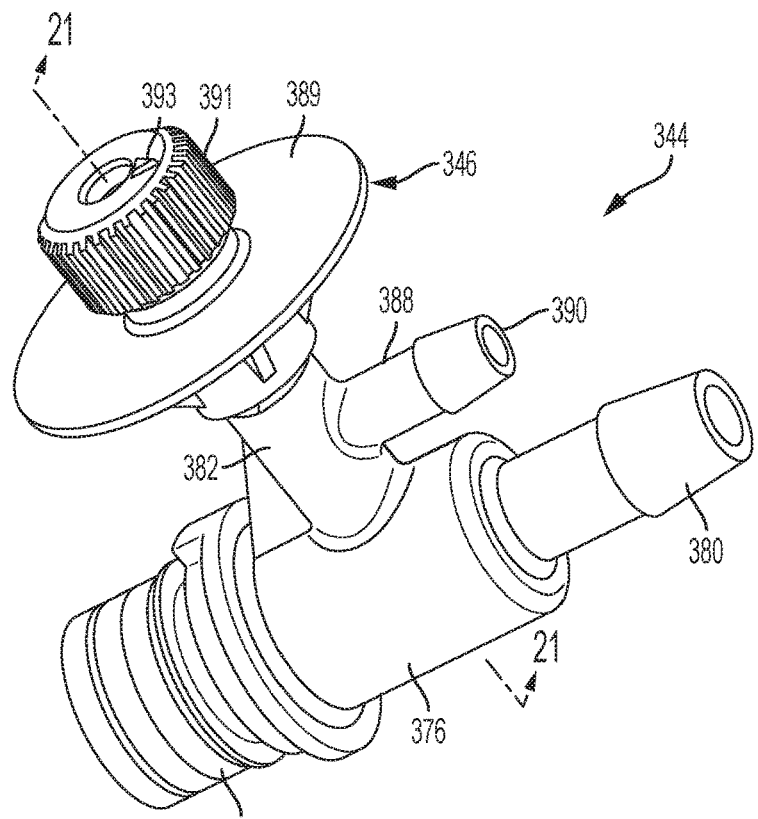
FIG. 20 is a perspective view of a input flow fitting suitable for use within the external bypass circuit shown in FIG. 16.
Figure 21:
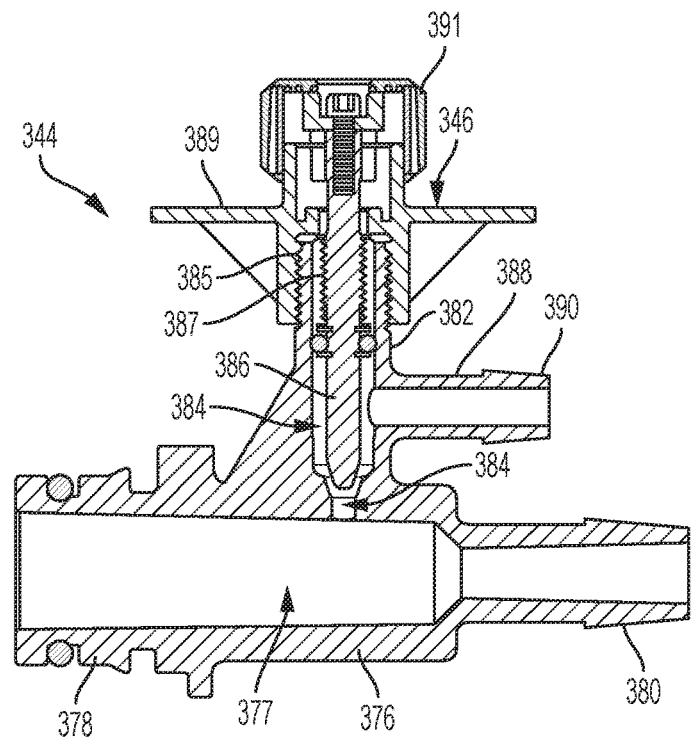
FIG. 21 is a longitudinal cross section of the input flow fitting shown in FIG. 20, taken generally along line 21-21 within in FIG. 20.

With reference to FIGS. 20 and 21, input flow fitting 344 may include a tubular body 376 defining a fluid flow path 377 extending from a first end 378 to a second send 380. First end 378 may be adapted to couple input flow fitting 344 with suction port 224 of pump 42 while second end 380 is adapted to fluidly couple input flow fitting 344 with manifold outlet fitting 204 (see FIGS. 3 and 4), such as through appropriate hosing or tubing (not shown). Input flow fitting 344 may further include a flow control arm 382 extending outwardly from tubular body 376. Flow control arm 382 is arranged substantially perpendicular to tubular body 376. Flow control arm 382 defines a flow control channel 384 wherein distal end 385 receives a threaded retainer 387 of needle valve assembly 346 therein. Needle 386 is threadably received within threaded retainer 387 whereby needle 386 may regulate fluid flow through flow control channel 384, as will be discussed in greater detail below. A retaining cap 389 secures threaded retainer 387 and needle 386 to flow control arm 382. A knob 391 is coupled to needle 386 so as to enable controlled placement of needle 386 within flow control channel 384 in relation to bypass orifice 395 which fluidly joins flow control channel 384 with fluid flow path 377. Knob 391 may include reference indicia 393 so as to provide a visual aid for a user to track the needle placement when adjusting the flow control, as will described below. Arranged along flow control arm 382 is a bypass fitting 388 having a fitted end 390 configured to receive second end 392 of bypass line 348. As a result, bypass fitting 388 is in fluid communication, via bypass line 348, with bypass arm 372 of flow diverter valve 336 whereby fluid may flow from flow diverter valve 336 to input flow fitting 344. Again, discussion of the seals and gaskets used to form water-tight connections has been omitted.

In operation, a low pressure fluid is drawn into positive displacement pump 42 through second end 380 of input flow fitting 344 during the suction stroke of the pump. The fluid is received from mixing manifold 38 and may include a liquid concentrate, such as a chemical from second tank 16, mixed within a diluent (water) from first tank 12. As described above, mixing of the fluids within mixing manifold 38 generates a discharge fluid having the liquid concentrate at a user-selected, consistent dilution. Upon further operation of positive displacement pump 42, the fluid is charged to a high pressure through the discharge stroke of the pump. This high pressure fluid is then discharged through flow diverter valve 336. Depending upon the positioning of handle 360 and ball valve 358, the high pressure fluid may exit through either high pressure fitting 364 or bypass fitting 368. If the fluid path within flow diverter valve 336 is directed toward high pressure fitting 364, all of the high pressure fluid will flow through high pressure fitting 364 for downstream delivery to a boom sprayer 232 or other high pressure output. Alternatively, if the fluid path within flow diverter valve 336 is directed toward bypass fitting 368, a sprayer portion of the fluid is delivered downstream through second end 370 to the low pressure output, such as a handheld wand 230, while the remainder of the fluid flow (the bypass portion) is recycled to input flow fitting 344 through bypass arm 372 and bypass line 348.

The amount of fluid flow received by input flow fitting 344 from flow diverter valve 336 may be selectively controlled by needle valve assembly 346. That is, needle 386 may be selectively positioned within flow control channel 384 (such as via knob 391) so as to constrict or expand to open volume of bypass orifice 395. For instance, by advancing needle 386 toward fluid flow path 377, the open volume of bypass orifice 395 is decreased. As a result, less fluid may be received by flow control channel 384, thus decreasing the volume of the bypass portion and increasing the volume (and pressure) of the sprayer portion. Conversely, by retreating needle 386 away from fluid flow path 377, the open volume of bypass orifice 395 is increased. As a result, more fluid may be received by flow control channel 384, thus increasing the volume of the bypass portion and decreasing the volume (and pressure) of the sprayer portion. Therefore, the volume and pressure of the sprayer portion may thus be selectively controlled by needle 386 and knob 391. It should also be noted that the bypass portion is recycled prior to positive displacement pump suction port 224 but after mixing manifold 38. Thus, the bypass portion is fed into already mixed fluid and not either the first tank 12 or second tank 16 as is known in the art. Therefore, dilution of the liquid concentrate is not changed when alternating between high flow and low flow operations, the diluent tank 12 does not become contaminated by the chemicals of the liquid concentrate within the bypass portion, and the liquid concentrate is not diluted in its tank 16 by the bypass portion. As a result, the unwanted rapid cycling of the pump and its cut off switch is eliminated while also preserving the desired dilution of the liquid concentrate within the sprayed fluid without contamination of the supply tanks.

Figure 22:
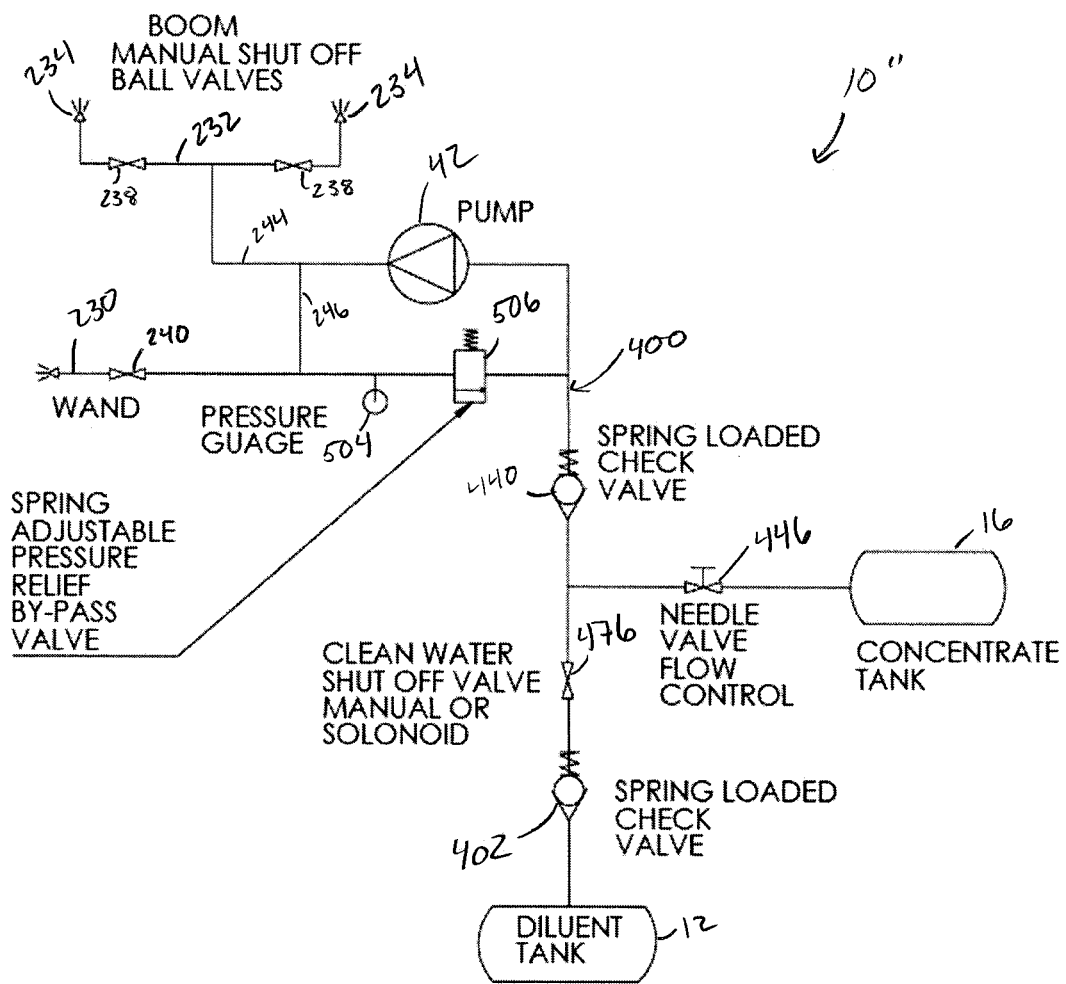
FIG. 22 is a schematic view of an embodiment of a fluid control assembly suitable for use within a variable pressure sprayer system.
Figure 23:
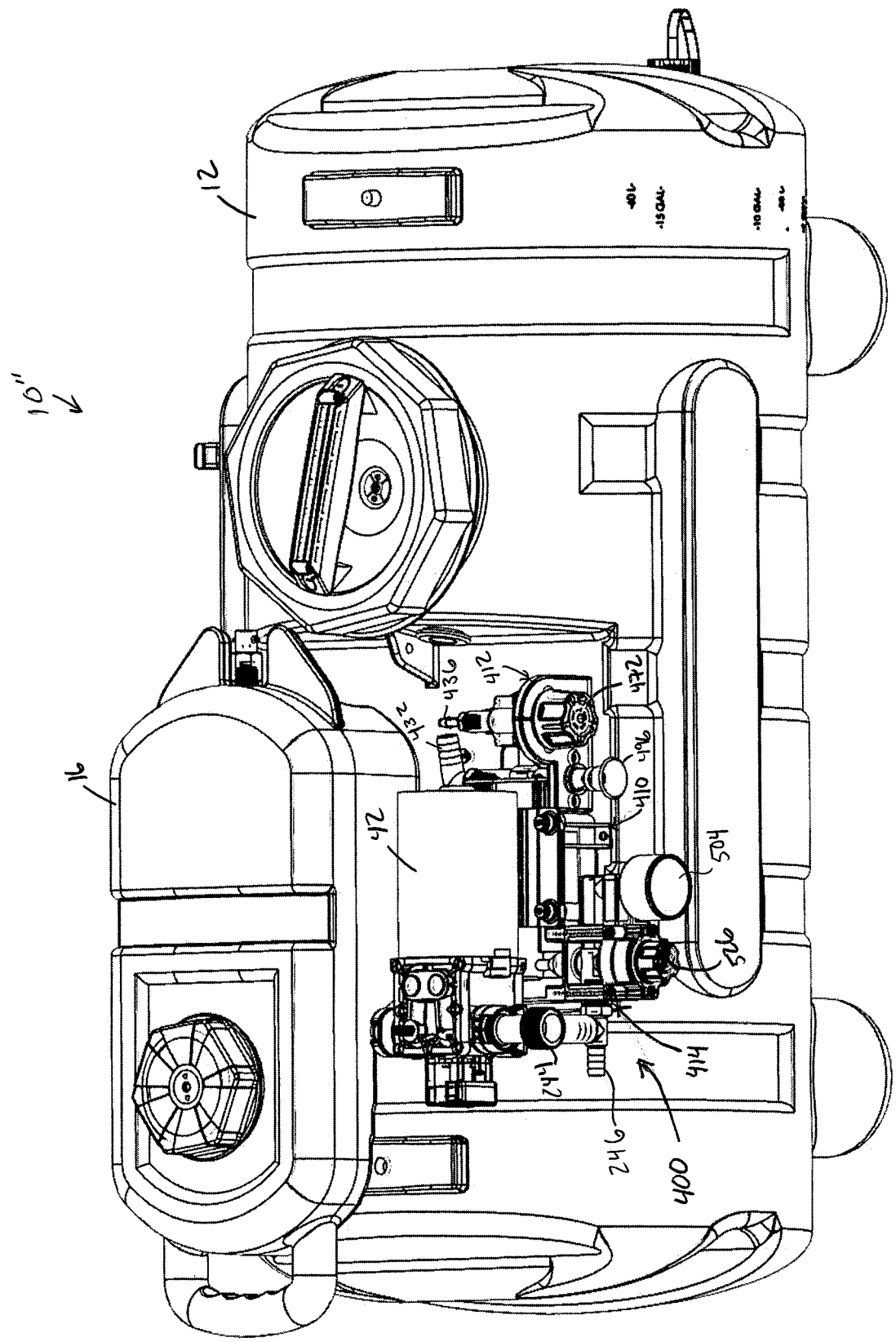
FIG. 23 is a perspective view of a sprayer system including an embodiment of the fluid control system in accordance with the present invention.

Turning now to FIGS. 22 and 23, an alternative fluid control assembly 400 for use with a sprayer system 10" may be configured to operate as a variable pressure sprayer. Sprayer system 10" may include first (diluent) tank 12 and second (concentrate) tank 16 each fluidly coupled to fluid control assembly 400 as will be described in greater detail below. Similar to check valve 228 described above, check valve 402 may be interposed between fluid control assembly 400 and first tank 12 to prevent backflow of mixed fluid into first tank 12. Also similarly to systems 10 and 10' described above, mixed fluid may be drawn through fluid control assembly 400 by operation of positive displacement pump 42. The mixed fluid may then be selectively delivered to either or both of a spray nozzle 230 (such as a handheld sprayer) or to a boom 232 upon which is mounted a plurality of boom nozzles 234, such as via selective opening/closing of valves 238, 240, through respective outlets, e.g., boom outlet 244 and wand outlet 246 (see also FIG. 24).

Figure 24:
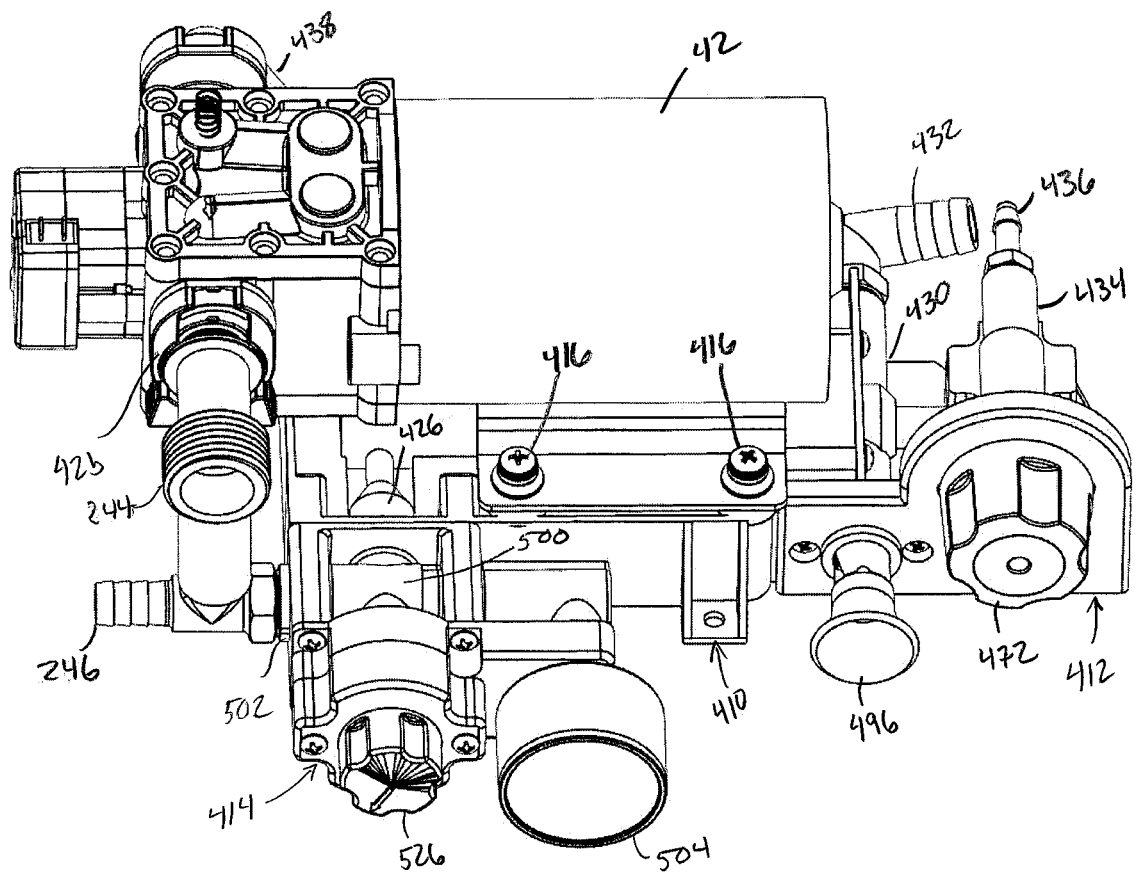
FIG. 24 is top front perspective view of an embodiment of the fluid control system shown in FIG. 23.
Figure 25:
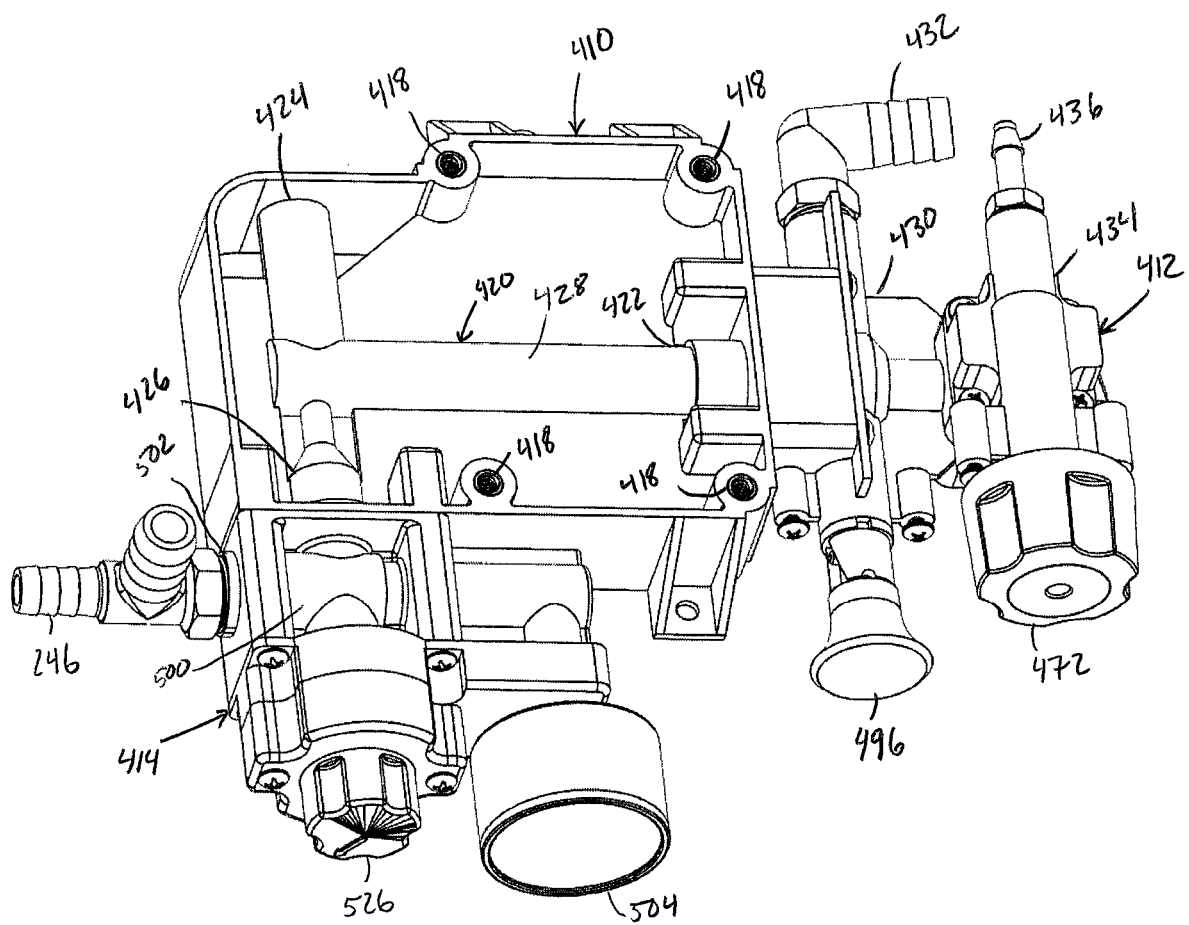
FIG. 25 is a top front perspective view of the fluid control system shown in FIG. 24, with the positive displacement pump removed.
Figure 26:
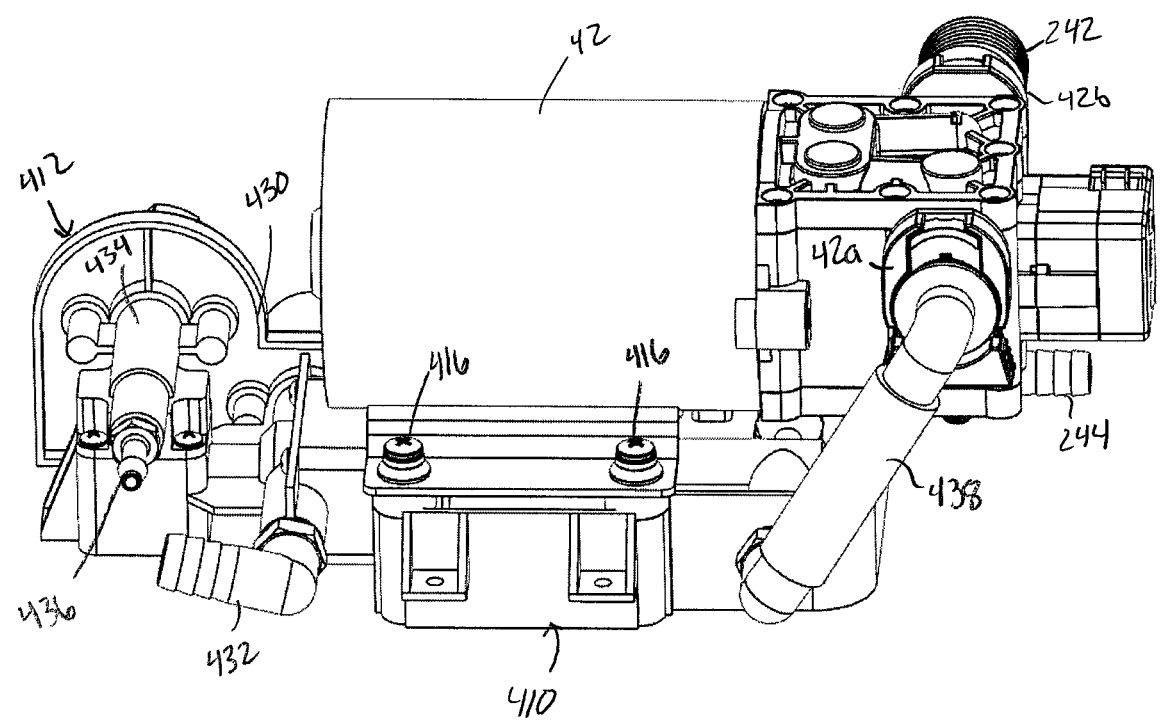
FIG. 26 is a rear perspective view of the fluid control system shown in FIG. 24.

With additional reference to FIGS. 24-26, fluid control assembly 400 generally includes a manifold 410, fluid input unit 412 and bypass unit 414. As shown most clearly in FIGS. 24 and 26, positive displacement pump 42 is mounted onto manifold 410, such as through a plurality of fasteners 416 received within threaded bores 418 (FIG. 25). With continued reference to FIG. 25 (see also FIGS. 30-32), manifold 410 defines a fluid conduit 420 having a fluid inlet 422, pump supply outlet 424 and bypass inlet 426. A mixing chamber 428 (described in greater detail below) is defined between fluid inlet 422 and pump supply outlet 424.

Fluid input unit 412 is coupled to manifold 410 via fluid inlet 422. Fluid input unit 412 includes a diluent input 430 which is configured to receive diluent (e.g., water) from diluent tank 12, such as via hose coupling 432. Concentrate input 434 is configured to receive liquid concentrate from concentrate tank 16 such as via hose coupling 436. As will be described in greater detail below, received diluent and fluid concentrate are mixed within mixing chamber 428 before exiting through pump supply outlet 424 to pump inlet 42a of positive displacement pump 42, such as via pump supply line 438 (FIG. 26). As shown most clearly in FIGS. 30-32, a check valve 440 may be located between mixing chamber 428 and fluid inlet 422 so as to assist in preventing backflow of mixed solution within mixing chamber 428 from flowing back toward diluent tank 12 (see also FIG. 22).

Figure 27:
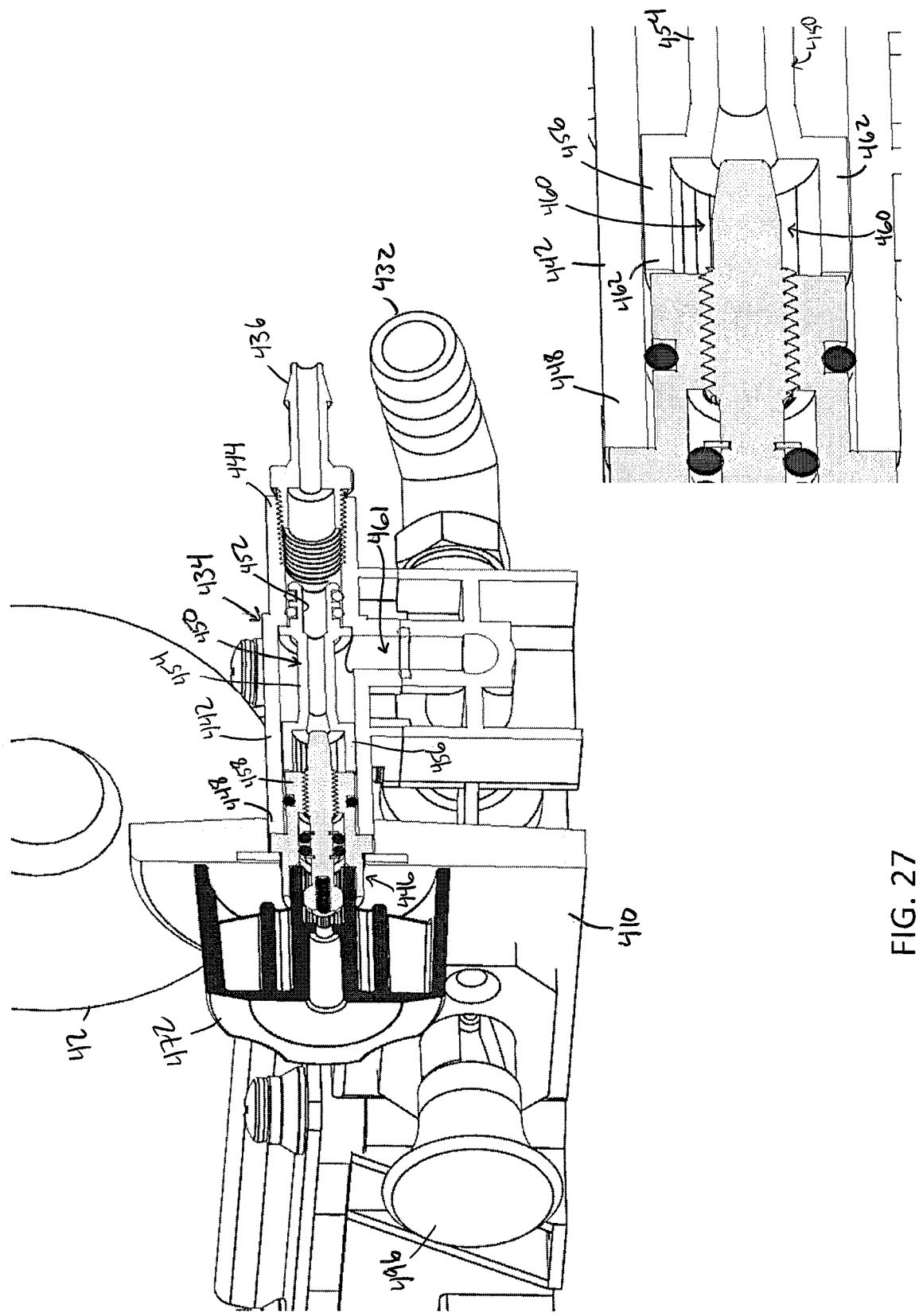
FIG. 27 is a cross section of a concentrate input included within the fluid control system shown in FIG. 24, with an expanded view of the needle valve assembly.

With reference to FIG. 27, a longitudinal cross-section view of concentrate input 434 is shown. Concentrate input 434 includes a concentrate housing 442 which receives hose coupling 436, such as via a threaded connection or quick-coupling connection and the like at, a first housing end 444. A needle valve assembly 446 is coupled to the opposing housing end 448 of concentrate housing 442. Located between hose coupling 436 and needle valve assembly 446 is valve insert 450. Valve insert 450 is generally a tubular member having a first end 452 sealably received within concentrate housing 442 proximate hose coupling 436. A central shaft portion 454 traverses concentrate housing whereby second end 456 of valve insert 450 engages valve nut 458 of needle valve assembly 446. Second end 456 includes one or more openings 460 therein to permit flow of liquid concentrate therethrough so as to permit flow of concentrate through concentrate inlet 461 to fluid inlet 422, as will be described in greater detail below. By way of example and without limitation thereto, second end 454 may include an annular series of alternating fingers 462 and opening 460.

As can be further seen in FIG. 27, the junction between central shaft portion 454 and second end 456 may define a flared opening portion 464. Flared opening portion 464 is proportioned to receive distal end 466 of needle valve 468. A medial portion 470 of needle valve 468 may be threadably coupled to valve nut 458, such that distal end 466 may be selectively translated within flared opening portion 464 between a fully closed position, a fully open position and any intermediate position therebetween so as to meter the flow of liquid concentrate received by concentrate input 434. By way of example and without limitation thereto, a knob 472 may be coupled to proximal end 474 of needle valve 468, whereby manual turning of knob 472 advances or retreats distal end 466 of needle valve 468 within flared opening portion 464. Alternatively, knob 472 may be replaced by a solenoid or other electromechanical component (not shown) so as to enable automated and/or digital control of needle valve 468.

Figure 28:
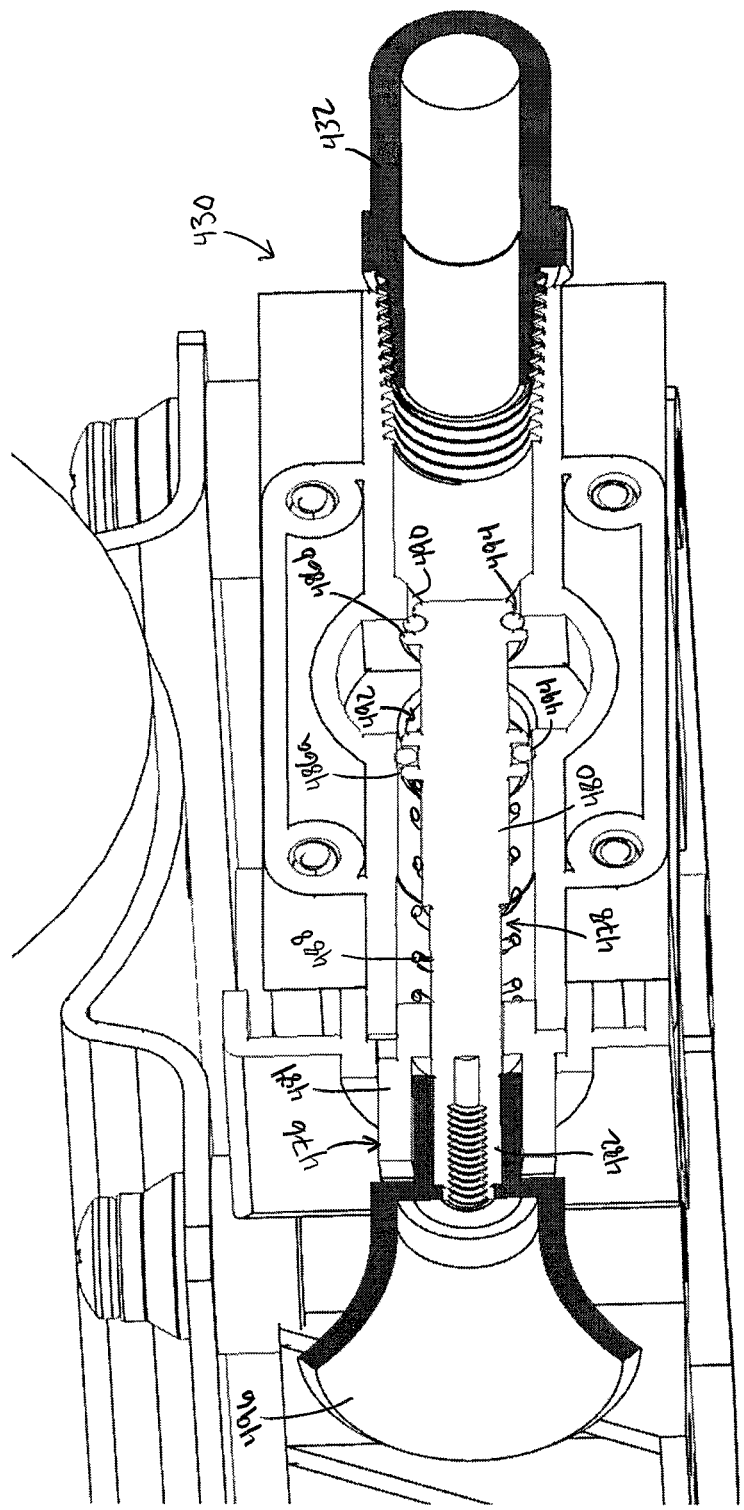
FIG. 28 is a cross section of a diluent input included within the fluid control system shown in FIG. 24.

Turning now to FIG. 28, diluent input 430 of fluid input unit 412 may include a diluent shut off valve assembly 476. Diluent shut off valve assembly 476 may comprise a spring-loaded plunger apparatus 478 including a plunger 480 having a first end 482 received within a plunger housing 484 and a second end including a pair of spaced-apart sealing flanges 486a, 486b thereon. Spring 488 seats between plunger housing 484 and first sealing flange 486a so as to bias second sealing flange 486b against opening 490 defined within diluent input 430. So biased, second end 492 of plunger 480 may close opening 490 and prevent inflow of diluent through hose coupling 432. However, retraction of plunger 480 within plunger housing 484 unseats second sealing flange 486b from opening 490 while also increasing the biasing force stored within spring 488. With opening 490 unimpeded, diluent may be drawn into diluent input 430 through hose coupling 432 during a pump suction stroke. First sealing flange 486a prevents diluent from flowing past plunger housing 484 such that all diluent is directed into fluid inlet 422 via diluent inlet 492. It should be noted that one or both of sealing flanges 486a, 486b may include an O-ring 494 to facilitate improved sealing.

Similar to concentrate input 434 described above, diluent input 430 may include a knob 496 coupled to first end 482 of plunger 480, whereby manual turning of knob 496 advances or retreats second end 492 of plunger 480 with respect to opening 490. Alternatively, knob 496 may be replaced by a solenoid or other electromechanical component (not shown) so as to enable automated control of plunger 480.

Figure 29:
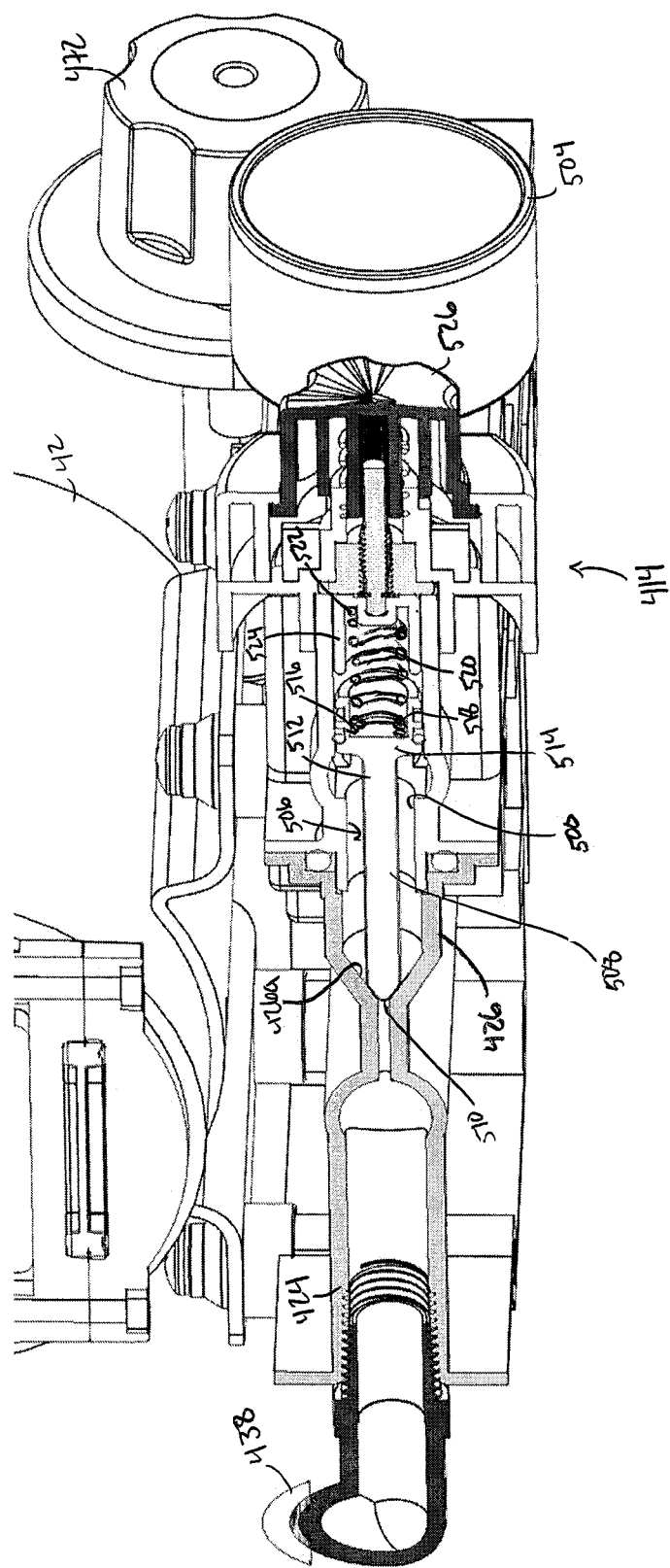
FIG. 29 is a cross section of a bypass unit included within the fluid control system shown in FIG. 24.

Returning to FIGS. 24-26, with additional reference to FIG. 29, bypass unit 414 is fluidly coupled to bypass inlet 426 of manifold 410 via a bypass conduit 500. High pressure input 502 is coupled to high pressure outlet 42b of positive displacement pump 42 such that a portion of the high pressure mixed fluid that exits positive displacement pump 42 flows into bypass conduit 500 where the pressure of the fluid is measured by pressure gage 504. Bypass conduit 500 further includes a bypass valve, such as spring-loaded bypass needle valve 506. As shown in FIG. 29, bypass needle valve 506 includes a shaft 508 having a distal end 510 biased to seat within bypass inlet seat portion 426a of bypass inlet 426. Proximal end 512 of bypass needle valve 506 includes a piston 514 defining a piston recess 516. First end 518 of spring 520 is received within piston recess 516 while second end 522 seats against valve plate 524 so as to bias distal end 510 against bypass inlet seat portion 426a. A knob 526 may be coupled to valve plate 524 so as to allow selective adjustment of the biasing force of spring 520, the operation of which will be discussed in greater detail below.

Figure 30:
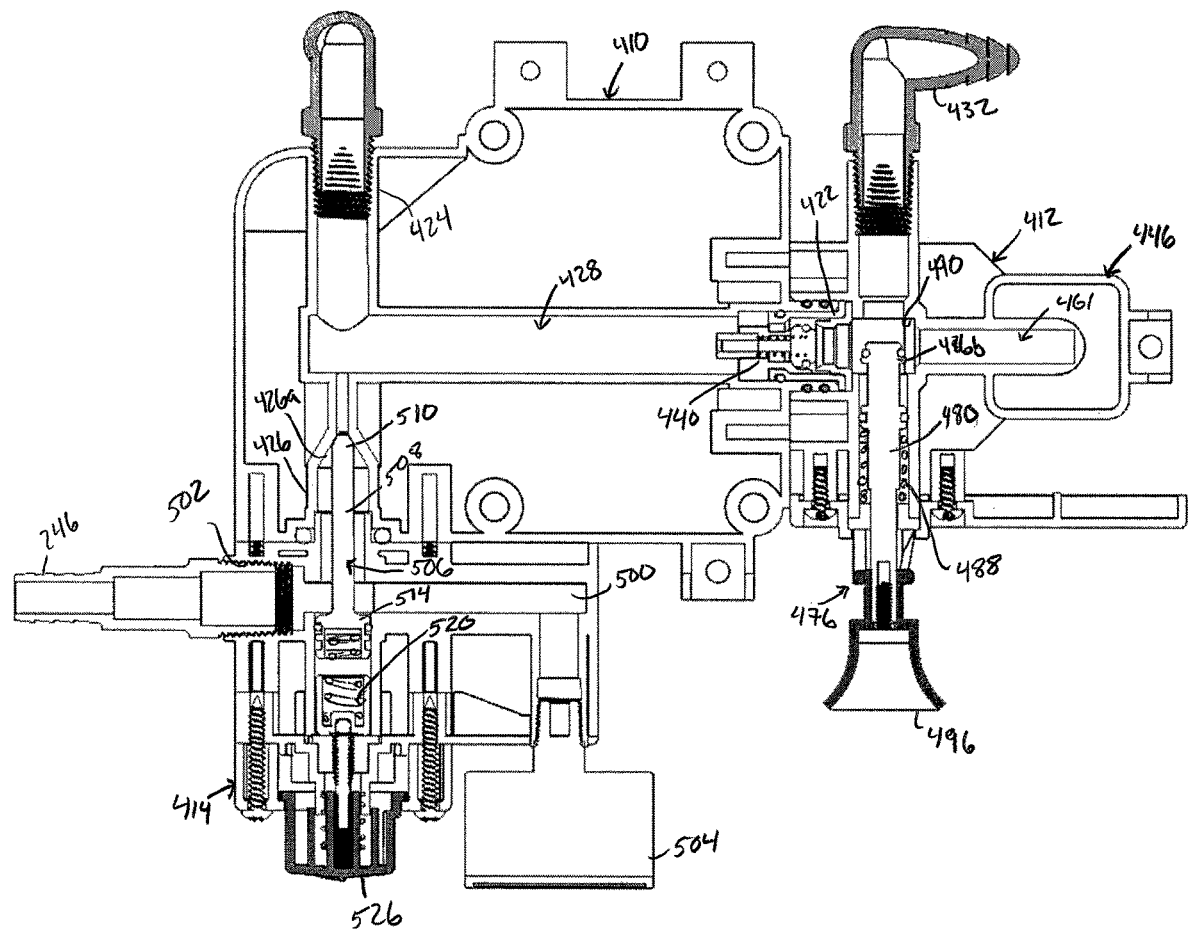
FIG. 30 is a top cross section of the fluid control system shown in FIG. 24, showing operation of the fluid control system under typical operating conditions.
Figure 31:
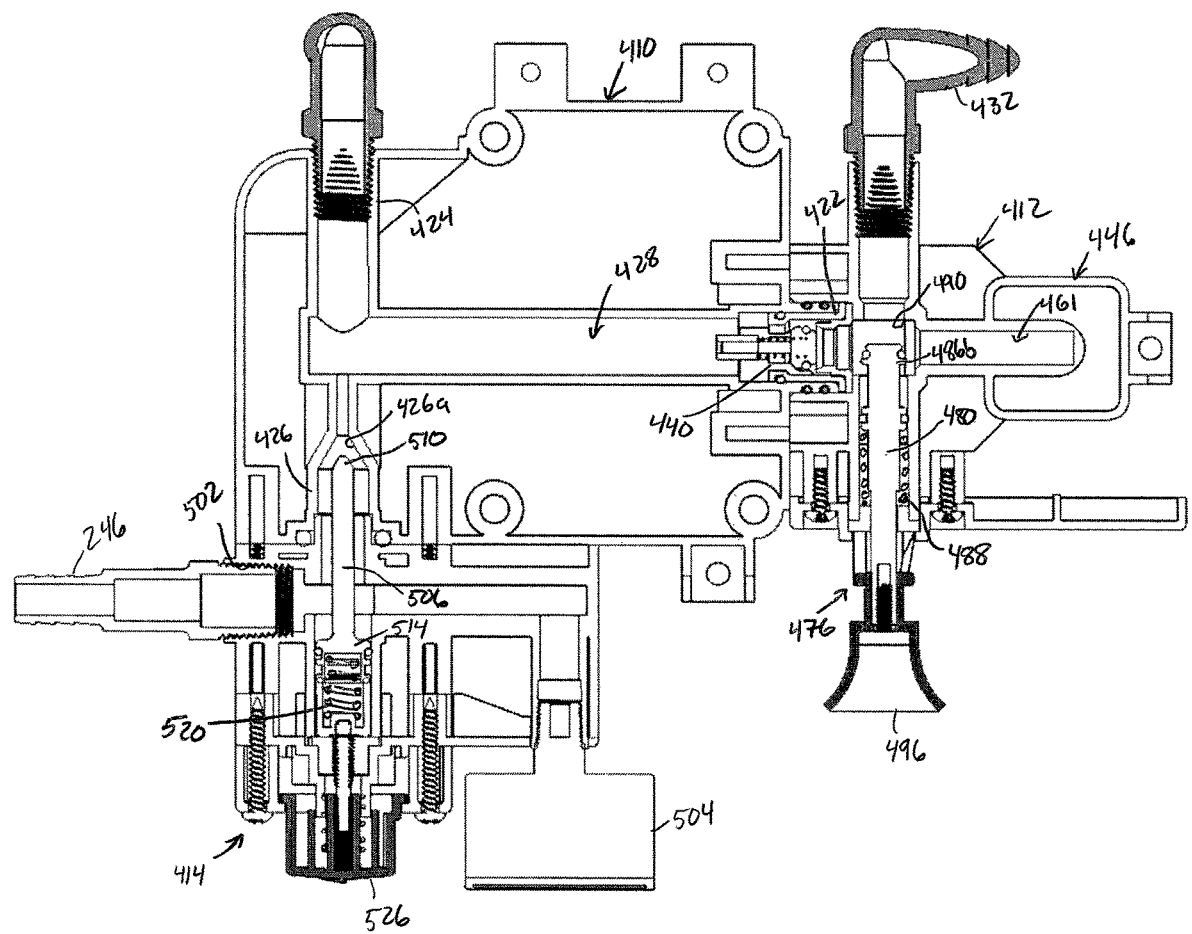
FIG. 31 is a top cross section of the fluid control system shown in FIG. 24, showing operation of the fluid control system under high fluid pressure operating conditions.
Figure 32:
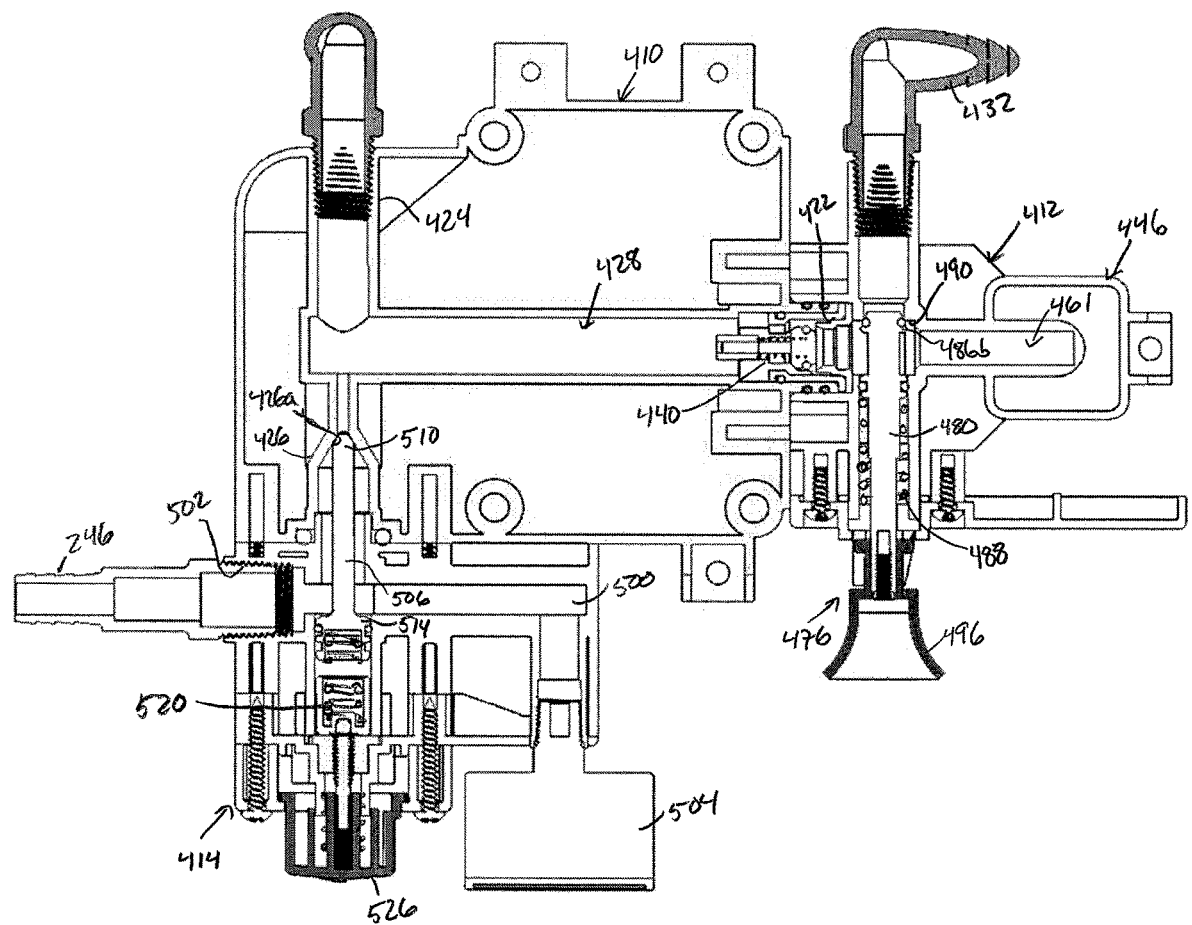
FIG. 32 is a top cross section of the fluid control system shown in FIG. 24, showing the fluid control system in an OFF/storage orientation.

Turning now to FIGS. 30-32, operation of some of the various features of fluid control assembly 400 are shown. FIG. 30 shows fluid control assembly 400 under typical operating conditions. That is, diluent shut off valve assembly 476 is configured such that spring-loaded plunger apparatus 478 has been actuated to position plunger 480 in an open orientation with spring 488 being charged with stored potential energy. Thus, during a suction stroke of positive displacement pump 42, diluent is drawn from diluent tank 12 through diluent input 430 while liquid concentrate is drawn from concentrate tank 16 through concentrate input 434 where the combined fluids are mixed within mixing chamber 428 of manifold 410. The mixed fluids may then be output to one or both of wand 230 or boom 232 during a pressure stroke of positive displacement pump 42. The pressure of the high pressure mixed fluid is below the threshold biasing force of spring 520 of bypass needle valve 506 such that distal end 510 remains seated against bypass inlet seat portion 426a of bypass inlet 426.

As shown in FIG. 31, should the pressure of the high pressure mixed fluid exceed the threshold biasing force of spring 520 of bypass needle valve 506, the high pressure mixed fluid will drive against piston 514 of proximal end 512 of bypass needle valve 506 so as to withdraw distal end 510 from bypass inlet seat portion 426a. As distal end 510 withdraws, bypass inlet 426 is opened to allow high pressure mixed fluid to bypass boom outlet 244 and wand outlet 246 and to recirculate into mixing chamber 428 to once again exit through pump supply outlet 424 to positive displacement pump 42. In accordance with an aspect of the present invention, the threshold biasing force of spring 520 is set to be slightly below the threshold of the cut off switch of positive displacement pump 42. As a result, the unwanted rapid cycling of the pump and its cut off switch is alleviated while also preserving the desired dilution of the liquid concentrate without contamination of either of the diluent or concentrate tanks.

FIG. 32 shows sprayer system 10" in an OFF orientation with fluid control assembly 400 set up for storage. To that end, power to positive displacement pump 42 has been terminated and plunger 480 has been actuated so as to release the stored potential energy (bias) within spring 488 and seat second sealing flange 486b against opening 490 defined within diluent input 430. Also, with positive displacement pump 42 no longer pressuring fluid, distal end 510 of bypass needle valve 506 seats against bypass inlet seat portion 426a of bypass inlet 426. As a result, diluent tank 12 is isolated from any fluids remaining in manifold 410, fluid input unit 412 and bypass unit 414. It should be noted that, in accordance with one aspect of the present invention, knob 496 may be manually actuated to store/discharge the potential energy within spring 488. In another aspect of the present invention, knob 496 may be replaced by a solenoid or other electromechanical component. The solenoid may be slaved to the power control of positive displacement pump 42. Thus, when positive displacement pump 42 is powered ON, the solenoid is powered ON to retract plunger 480, and when positive displacement pump 42 is switched to the OFF orientation, the solenoid is unpowered whereby spring 488 biases distal end 510 against bypass inlet seat portion 426a.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A flow control assembly comprising:
   a) a manifold configured to be coupled to a positive displacement pump, wherein the manifold defines a fluid conduit having a fluid inlet, a pump supply outlet, a bypass inlet and a mixing chamber between the fluid inlet and both of the pump supply outlet and the bypass inlet;
   b) a fluid input unit fluidly coupled to the fluid inlet of the manifold, wherein the fluid input unit includes a diluent input configured to receive a fixed flow of a diluent from a diluent tank, and a concentrate input configured to receive a selectively adjustable flow of a liquid concentrate from a concentrate tank, wherein the mixing chamber of the fluid conduit is configured to mix the diluent and the liquid concentrate to form a mixed solution to be delivered through the pump supply outlet to a pump inlet on the positive displacement pump; and c) a bypass unit having a bypass conduit fluidly coupled to the bypass inlet of the manifold and a high pressure input configured to couple to a high pressure output on the positive displacement pump to receive a high pressure mixed fluid therefrom, wherein the bypass unit includes a bypass valve positionable within the bypass inlet of the manifold between a closed position and an open position, wherein the bypass valve is in the closed position when the high pressure mixed fluid is below a threshold pressure, and wherein the bypass valve is in the open position when the high pressure mixed fluid is above the threshold pressure whereby a portion of the high pressure mixed fluid is reintroduced to the mixing chamber of the fluid conduit of the manifold via the bypass conduit and the bypass inlet.

2. The flow control assembly of claim 1 wherein the fluid input unit further includes a concentrate needle valve assembly coupled to the concentrate input whereby the concentrate needle valve assembly is configured to selectively control the adjustable flow of the liquid concentrate from the concentrate tank.

3. The flow control assembly of claim 1 wherein the fluid input unit further includes a diluent shut-off valve assembly coupled to the diluent input wherein the diluent shut-off valve assembly includes a diluent shut-off valve positionable between a closed position and an open position, wherein the fixed flow of the diluent is prevented when the diluent shut-off valve is in the closed position, and wherein the fixed flow of the diluent is enabled when the diluent shut-off valve is in the open position.

4. The flow control assembly of claim 3 wherein the diluent shut-off valve includes a spring-loaded plunger having a spring biasing the plunger to the closed position.

5. The flow control assembly of claim 4 wherein the diluent shut-off valve is manually actuatable and includes a knob coupled to the plunger to retract the plunger to the open position or is mechanically actuatable and includes a solenoid coupled to the plunger which operates to retract the plunger to the open position when the solenoid is powered.

6. The flow control assembly of claim 1 wherein the bypass valve includes a spring-loaded plunger having a spring biasing the plunger to the closed position.

7. The flow control assembly of claim 6 wherein the bypass unit further includes a knob coupled to the bypass valve, whereby actuation of the knob changes the biasing force of the spring-loaded plunger to thereby selectively adjust the threshold pressure.

8. The flow control assembly of claim 1 wherein the bypass unit further includes a pressure gage configured to monitor a fluid pressure of the high pressure mixed fluid within the bypass unit.

9. The flow control assembly of claim 1 wherein the manifold includes a check valve between the mixing chamber and the fluid inlet wherein the check valve is configured to prevent backflow of the mixed solution toward the diluent tank.

10. A flow control assembly comprising:

a) a manifold configured to be coupled to a positive displacement pump, wherein the manifold defines a fluid conduit having a fluid inlet, a pump supply outlet, a bypass inlet, a mixing chamber between the fluid inlet and both of the pump supply outlet and the bypass inlet, and a check valve between the mixing chamber and the fluid inlet;

b) a fluid input unit fluidly coupled to the fluid inlet of the manifold, wherein the fluid input unit includes:
 i) a diluent input configured to receive a fixed flow of a diluent from a diluent tank;
 ii) a diluent shut-off valve assembly coupled to the diluent input wherein the diluent shut-off valve assembly includes a diluent shut-off valve positionable between a closed position and an open position, wherein the fixed flow of the diluent is prevented when the diluent shut-off valve is in the closed position, and wherein the fixed flow of the diluent is enabled when the diluent shut-off valve is in the open position, and wherein the diluent shut-off valve includes a spring-loaded plunger having a spring biasing the plunger to the closed position, wherein the shut-off valve is manually actuatable and includes a knob coupled to the plunger to retract the plunger to the open position or is mechanically actuatable and includes a solenoid coupled to the plunger which operates to retract the plunger to the open position when the solenoid is powered;
 iii) a concentrate input configured to receive a selectively adjustable flow of a liquid concentrate from a concentrate tank and a concentrate needle valve assembly coupled to the concentrate input whereby the concentrate needle valve assembly is configured to selectively control the adjustable flow of the liquid concentrate from the concentrate tank, wherein the mixing chamber of the fluid conduit is configured to mix the diluent and the liquid concentrate to form a mixed solution to be delivered through the pump supply outlet to a pump inlet on the positive displacement pump and wherein the check valve is configured to prevent backflow of the mixed solution toward the diluent tank; and c) a bypass unit having a bypass conduit fluidly coupled to the bypass inlet of the manifold and a high pressure input configured to couple to a high pressure output on the positive displacement pump to receive a high pressure mixed fluid therefrom, wherein the bypass unit includes:
 i) a bypass valve including a spring-loaded plunger positionable within the bypass inlet between a closed position and an open position, wherein the bypass valve is biased via a spring to the closed position when the high pressure mixed fluid is below a threshold pressure, and wherein the bypass valve is driven to the open position when the high pressure mixed fluid is above the threshold pressure whereby a portion of the high pressure mixed fluid is reintroduced to the mixing chamber of the fluid conduit of the manifold via the bypass conduit and the bypass inlet;
 ii) a knob coupled to the bypass valve, whereby actuation of the knob changes the biasing force of the spring-loaded plunger to thereby selectively adjust the threshold pressure; and
 iii) a pressure gage configured to monitor fluid pressure of the high pressure mixed fluid within the bypass unit.

11. A sprayer system comprising:
a) a diluent tank configured to hold a diluent;
b) a concentrate tank configured to hold a liquid concentrate;
c) a positive displacement pump having a pump inlet and a high pressure output; and
d) a flow control assembly comprising:

i) a manifold coupled to the positive displacement pump, wherein the manifold defines a fluid conduit having a fluid inlet, a pump supply outlet, a bypass inlet and a mixing chamber between the fluid inlet and both of the pump supply outlet and the bypass inlet;

ii) a fluid input unit fluidly coupled to the fluid inlet of the manifold, wherein the fluid input unit includes a diluent input configured to receive a fixed flow of the diluent from the diluent tank, and a concentrate input configured to receive a selectively adjustable flow of the liquid concentrate from the concentrate tank, wherein the mixing chamber of the fluid conduit is configured to mix the diluent and the liquid concentrate to form a mixed solution to be delivered through the pump supply outlet to the pump inlet on the positive displacement pump; and iii) a bypass unit having a bypass conduit fluidly coupled to the bypass inlet of the manifold and a high pressure input coupled to the high pressure output on the positive displacement pump to receive a high pressure mixed fluid therefrom, wherein the bypass unit includes a bypass valve positionable within the bypass inlet of the manifold between a closed position and an open position, wherein the bypass valve is in the closed position when the high pressure mixed fluid is below a threshold pressure, and wherein the bypass valve is in the open position when the high pressure mixed fluid is above the threshold pressure whereby a portion of the high pressure mixed fluid is reintroduced to the mixing chamber of the fluid conduit of the manifold via the bypass conduit and the bypass inlet.

* * * * *